United States Patent
Vlavianos et al.

(10) Patent No.: US 11,001,016 B2
(45) Date of Patent: May 11, 2021

(54) METHODS AND APPARATUS FOR RECONFIGURABLE HEATED MOLD

(71) Applicant: Massachusetts Institute of Technology, Cambridge, MA (US)

(72) Inventors: Nikolaos Vlavianos, Boston, MA (US); Christoph Schumann, Frankfurt am Main (DE)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 16/853,231

(22) Filed: Apr. 20, 2020

(65) Prior Publication Data
US 2020/0331214 A1    Oct. 22, 2020

Related U.S. Application Data

(60) Provisional application No. 62/837,142, filed on Apr. 22, 2019.

(51) Int. Cl.
  *B29C 70/44*  (2006.01)
  *B29C 33/02*  (2006.01)
  (Continued)

(52) U.S. Cl.
  CPC ............ *B29C 70/443* (2013.01); *B29C 33/02* (2013.01); *B29C 33/307* (2013.01); *B29C 33/308* (2013.01); *B29C 51/36* (2013.01)

(58) Field of Classification Search
  CPC ... B29C 70/443; B29C 33/308; B29C 33/307; B29C 51/36; B29C 33/02;
  (Continued)

(56) References Cited

U.S. PATENT DOCUMENTS 2,334,520 A * 11/1943 Walters .................... B21D 1/00
  72/413
4,212,188 A *  7/1980 Pinson ..................... B21D 5/01
  72/413
(Continued)

OTHER PUBLICATIONS

Centea, T., et al., A review of out-of-autoclave prepregs—Material properties, process phenomena, and manufacturing considerations; published in Composites Part A: Applied Science and Manufacturing vol. 70, pp. 132-154, Mar. 2015.
(Continued)

*Primary Examiner* — Nahida Sultana
(74) *Attorney, Agent, or Firm* — Stephen R. Otis

(57) ABSTRACT

Layers of composite material, such as pre-peg, may be deposited on a reconfigurable polymer mold. An array of actuated pins may deform the polymer mold into a desired 3D shape. The composite material may be inside a cavity formed by the mold and a flexible bag. A vacuum pump may remove air from the cavity, creating a partial vacuum. The partial vacuum may cause the flexible bag to press the composite tightly against the mold, so that the composite conforms to the desired 3D shape. One or more heating elements may be embedded in the mold and may heat the composite to cure the composite. Ball joints may connect the actuated pins to the polymer mold.

20 Claims, 11 Drawing Sheets

(51) Int. Cl.
 *B29C 51/36* (2006.01)
 *B29C 33/30* (2006.01)

(58) Field of Classification Search
 CPC . B29C 2035/0211; B29C 35/02; B29C 70/44;
 B29C 2791/006; B29C 51/10; B29C
 51/002; B29C 51/28; B29C 51/30; B29K
 2105/06
 See application file for complete search history.

(56) References Cited

U.S. PATENT DOCUMENTS

| | | | |
|---|---|---|---|
| 5,187,969 | A | 2/1993 | Morita |
| 5,330,343 | A | 7/1994 | Berteau |
| 5,546,313 | A | 8/1996 | Masters |
| 5,546,784 | A | 8/1996 | Haas et al. |
| 5,796,620 | A | 8/1998 | Laskowski et al. |
| 6,012,314 | A | 1/2000 | Sullivan et al. |
| 6,089,061 | A | 6/2000 | Haas et al. |
| 6,209,380 | B1 | 4/2001 | Papazian et al. |
| 6,298,896 | B1 * | 10/2001 | Sherrill .................. B29C 43/56 156/581 |
| 6,578,399 | B1 * | 6/2003 | Haas ...................... B21D 22/10 72/342.1 |
| 6,903,871 | B2 | 6/2005 | Page |
| 8,469,344 | B2 * | 6/2013 | Halford .................. B23Q 3/00 269/266 |
| 8,939,754 | B2 * | 1/2015 | Wang ..................... B21D 37/02 425/403 |
| 9,298,264 | B2 | 3/2016 | Leithinger et al. |
| 9,427,898 | B2 * | 8/2016 | Percival, Jr. .......... B29C 43/361 |
| 9,539,739 | B2 | 1/2017 | Ruthrauff |
| 2012/0279812 | A1 | 11/2012 | Peters et al. |
| 2018/0091893 | A1 * | 3/2018 | Howes ..................... H04R 1/02 |
| 2018/0222107 | A1 * | 8/2018 | Hall ........................ B29C 51/18 |

OTHER PUBLICATIONS

Gertner, Y., et al., Die-Less Forming of Large and Variable-Radii of Curvature in Continuous-Fiber Thermoplastic-Matrix Composite Materials; published in Journal of Thermoplastic Composite Materials, vol. 9, Issue 2, Apr. 1996.

Gutowski, T., et al., Differential geometry and the forming of aligned fibre composites; published in Composites Manufacturing, vol. 2, Issues 3-4, pp. 147-152, year 1991.

Munro, C., et al., Reconfigurable Pin-Type Tooling: A Survey of Prior Art and Reduction to Practice; published in Journal of Manufacturing Science and Engineering, vol. 129, Jun. 2007.

Walczyk, D., et al., Using Reconfigurable Tooling and Surface Heating for Incremental Forming of Composite Aircraft Parts; published in Journal of Manufacturing Science and Engineering, vol. 125, May 2003.

Walczyk, D., et al., Design and analysis of reconfigurable discrete dies for sheet metal forming; published in Journal of Manufacturing Systems, vol. 17, No. 6, year 1998.

* cited by examiner

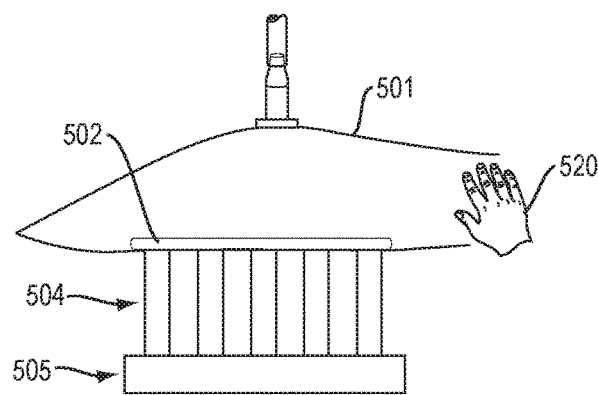
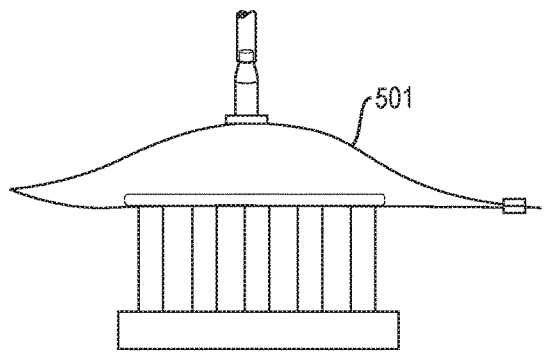
FIG. 5A  FIG. 5B
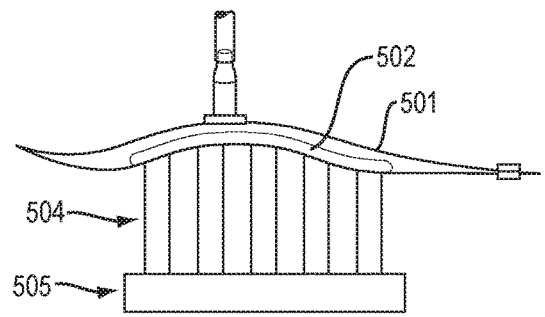
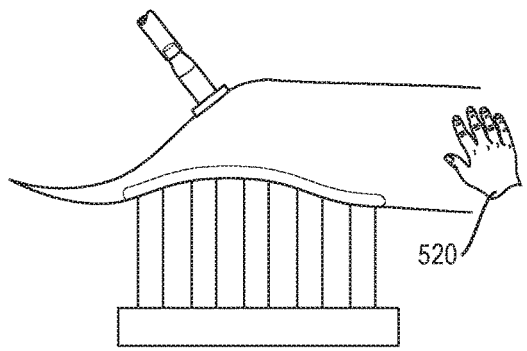
FIG. 5C  FIG. 5D
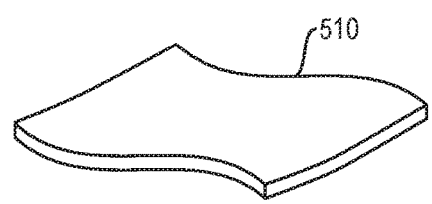
FIG. 5E

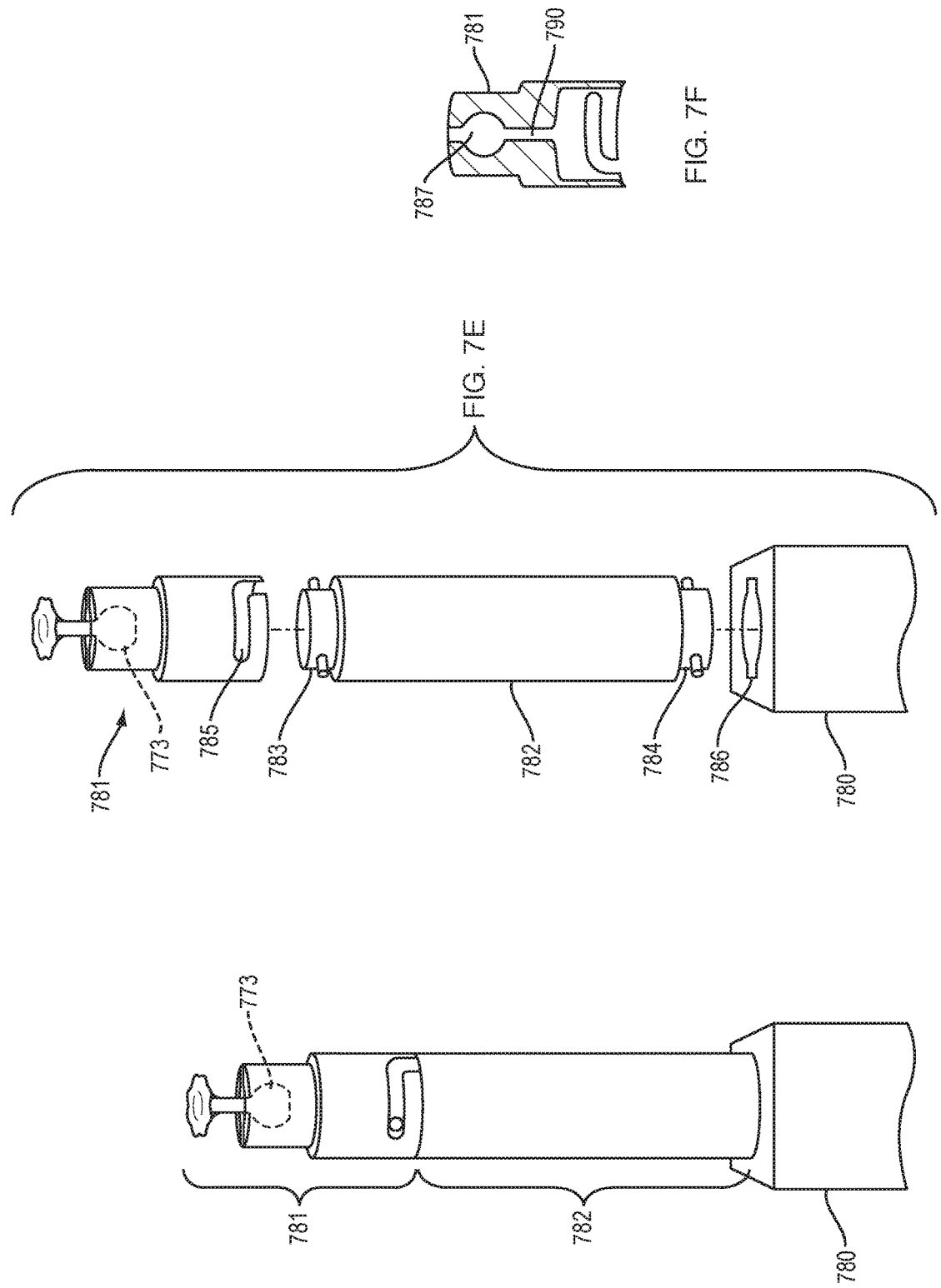

METHODS AND APPARATUS FOR RECONFIGURABLE HEATED MOLD

RELATED APPLICATIONS

This application claims the benefit of U.S. Provisional Application No. 62/837,142 filed Apr. 22, 2019 (the "Provisional").

FIELD OF TECHNOLOGY

The present invention relates generally to reconfigurable, heated molds, whose shape is controlled by actuated pins.

COMPUTER PROGRAM LISTING

The following two computer program files are incorporated by reference herein: (1) PIDandDisplay.txt with a size of about 7 KB, created as an ASCII .txt file on Apr. 9, 2020; and (2) ReadData.txt with a size of about 5 KB, created as an ASCII .txt file on Apr. 6, 2020.

SUMMARY

In illustrative implementations of this invention, a reconfigurable mold is used to fabricate a composite object. The composite comprises two or more substances. For instance, the composite material may be a carbon fiber reinforced polymer (CFRP), which comprises carbon fibers that are fused together in layers by a binding matrix material (e.g., resin and hardener). The CFRP may have a high strength-to-weight ratio, may be stiff, and may comprise a thermosetting or thermoplastic polymer.

In illustrative implementations, actuated pins control the shape of a polymer mold. The pins may be attached to the polymer mold by joints or other flexible attachments. One or more electric motors may actuate linear motion of the pins, in such a way that: (a) the pins move along parallel axes (e.g., vertical axes); and (b) the motion of each pin is individually controlled. The linear motion of the pins may change the shape of the polymer mold, causing the mold to elastically deform. For instance, when all of the top ends of pins are at the same vertical height, the polymer mold may be flat. When the top ends of different pins are at different vertical heights, the polymer mold may be deformed into a 3D shape, such as a 3D curve.

One or more heating elements may be embedded in the polymer mold. The heating elements may, by Joule heating, convert electrical energy to heat. This heat may conduct from the mold to a composite object being fabricated, and may cause one or more materials (e.g., resin) in the composite to fuse, cure, melt, set and/or thermoset. For instance, the heating element(s) may each comprise an etched foil heater or a resistance wire. In some cases, the heating element(s) are embedded entirely inside the polymer mold, but are near (e.g., between 0.3 mm and 3 mm from) the surface of the mold that faces the composite material. The conductive portion of each heating element (e.g., resistance wire or a foil in an etched foil heater) may wind back and forth inside the polymer mold in a sinusoidal, zig-zag, square wave, convoluted, folded, or other close-packed spatial pattern. When the actuated pins cause the polymer mold to be flat, the conductive portion of the heating element may wind back and forth in a roughly 2D spatial pattern that is parallel to a surface of the polymer mold. If etched foil heater(s) are employed, then each etched foil heater may have holes or cutouts. During fabrication of the polymer mold, liquid polymer may flow into these holes or cutouts, thereby connecting layers of the mold that are on opposite sides of the etched foil heater and preventing these layers from separating after the mold cures.

In some cases, multiple heating elements are embedded in the polymer mold and each heating element heats a different portion of the mold. For instance, in some cases: (a) multiple heating elements are embedded in the polymer mold, each in a different, non-overlapping region of the polymer mold; and (b) each heating element that heats a region is independently controlled based on feedback from one or more temperature sensors located in that region. For example, if three heating elements are embedded in the mold, then three different regions of the mold may be simultaneously heated to different temperatures.

In some cases, a microcontroller performs closed loop PID (proportional-integral-derivative) control of temperature, based on feedback from one or more temperature sensors embedded in the mold. For instance, the PID controller may control temperature by controlling output voltage of a power supply unit, which in turn determines the amount of electric current that flows through a heating element. The temperature sensor(s) may be resistance temperature detectors (RTDs) or thermocouples.

In some cases, the heating element(s) and temperature sensors are embedded at different depths in the polymer mold. For instance, the temperature sensors may be embedded at twice the depth (from the mold's top surface) as are the heating element(s). Or, for instance, the heating element(s) and the temperature sensors may be located at the same depth from the top surface of the mold.

In some implementations, the composite (which is being fabricated) is inside a cavity formed by a flexible bag and the polymer mold. A vacuum pump may evacuate air from the cavity to create a partial vacuum inside the cavity. The resulting pressure differential—between air pressure inside the cavity and air pressure outside the cavity—may cause the flexible bag to press against the composite. The force exerted by the bag against the composite (due to the pressure differential) may: (a) press the composite tightly against the polymer mold (and thereby cause the composite to conform to the shape of the mold); (b) expel air or gas bubbles from the composite; (c) expel excess resin from the composite; (d) create a more even spatial distribution of resin; and (e) reduce the risk of layers of the composite separating during or after fabrication. After each layer of the composite (e.g., pre-peg) is deposited, a partial vacuum may be applied and then released. When the partial vacuum is released, the air pressure inside the cavity may increase back to ambient air pressure. Also, throughout the entire curing period, a partial vacuum may be maintained. This partial vacuum may be released when the composite is fully cured.

In some implementations, each of the actuated pins is attached to the polymer membrane by a ball joint. The ball joints allow attachment regions in the mold (i.e., regions in which the ball joint attaches to the mold) to change angular orientation relative to the actuated pins (which travel in parallel, linear motion paths). Thus, the ball joints may reduce the strain in the polymer mold when the mold deforms, as compared to the strain in the mold that would occur if the mold were attached to the pins by rigid attachments. Each ball joint may include a bearing stud and a bearing socket. One end of each bearing stud may be embedded in the polymer mold. The other end of each bearing stud may be a roughly spherical protuberance (e.g., a truncated sphere). The roughly spherical protuberance may fit inside a socket of the ball joint. The socket in turn may be directly or indirectly attached to the actuated pin. The bearing stud may change angular orientation relative to the bearing socket and the actuated pin.

In illustrative implementations of this invention, a reconfigurable mold may be used to make different shapes of objects. To change the shape of the mold, the actuated pins are simply moved to different positions. In contrast, in a conventional mold: (a) the shape of the mold is fixed; (b) the mold can only fabricate one shape of object; and (c) to change shape, a new conventional mold would need to be created, which is expensive and time-consuming. In illustrative implementations of this invention, the reconfigurable mold solves that problem.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 5A, 5B, 5C, 5D, and 5E illustrate a fabrication method in which a partial vacuum is employed.
FIGS. 7D, 7E, 7F, 7G, 7H, 7I, 7J, 7K, and 7L illustrate ball joints and attachments to the ball joints.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

In illustrative implementations of this invention, an array of actuated pins controls the shape of a reconfigurable, heated mold. This reconfigurable mold may be employed to fabricate a composite object. For example, the composite object may be fabricated from a carbon fiber reinforced polymer (CFRP), a thermosetting polymer, or a thermoplastic polymer.

Figure 1:
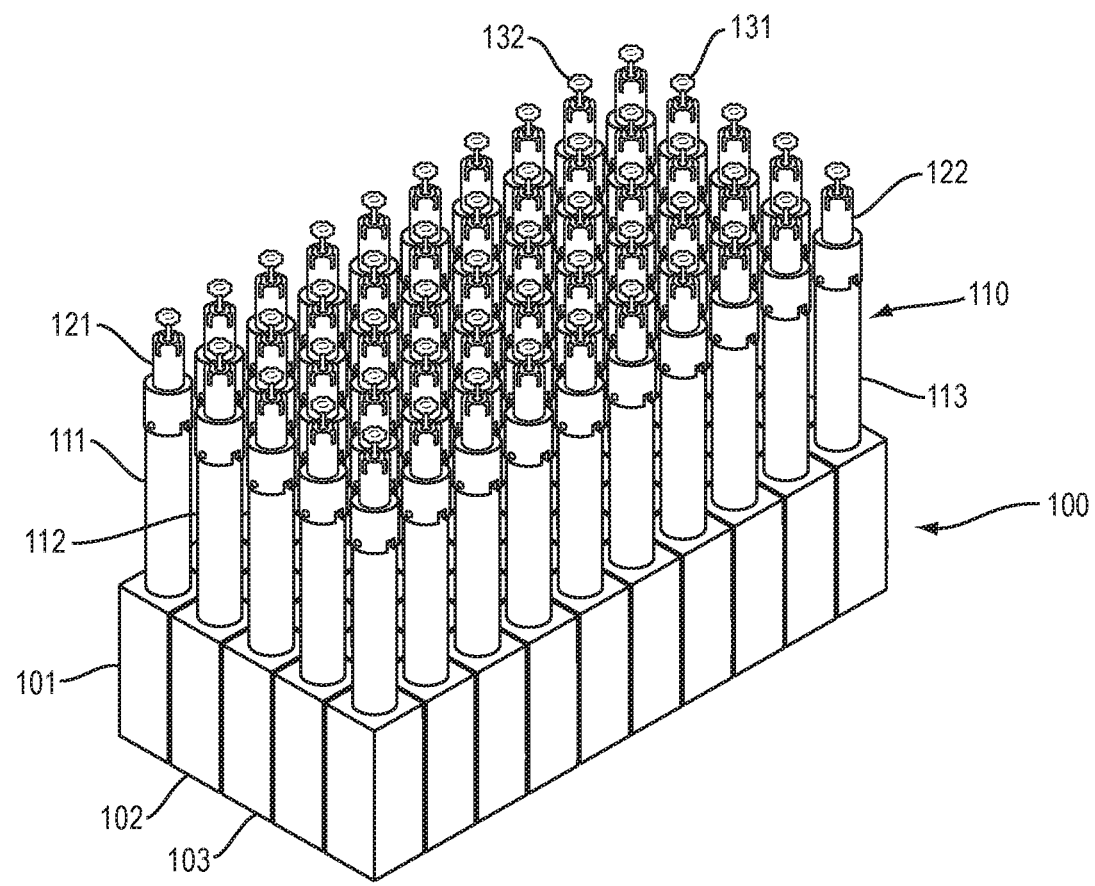
FIG. 1 shows an array of actuated pins.

FIG. 1 shows an array of actuated pins, in an illustrative implementation of this invention. In FIG. 1, an array of linear actuators 100 actuates linear motion of an array of pins 110.

In FIG. 1, each of the linear actuators (e.g., 101, 102, 103) may comprise a servomotor, which includes both an electric motor and a position sensor that provides feedback for controlling the motor. In some implementations, the linear actuators are DC (direct current) electric linear servomotors. In some cases, the electric motor in each servomotor is a DC electronically commutated brushless motor, an AC (alternating current) brushless electric motor with permanent magnet fields, or a DC brushed permanent magnet motor. Any type of position sensor may be employed in each servomotor. For instance, in each servomotor, position may be measured by an optical sensor, magnetic sensor, inductive sensor, capacitive sensor or eddy current sensor. The position sensor in each servomotor may comprise an absolute or incremental linear (or rotary) encoder.

Alternatively, in FIG. 1, each of the linear actuators (e.g., 101, 102, 103) may comprise a stepper motor which operates with open loop control (i.e., with no feedback from a position sensor). In some cases, the stepper motor comprises a permanent magnet stepper, variable reluctance stepper, or a hybrid synchronous stepper. In some cases, the stepper motor is a two-phase stepper motor (e.g., unipolar or bipolar). In some cases, the stepper motor's driver circuit comprises an L/R driver circuit or a chopper drive circuit.

In FIG. 1, the pins (e.g., 111, 112, 113) have a round cross-section. Alternatively, the cross-section of each pin may be square, rectangular, or any other shape. Each of the pins may be elongated, in such a way that the length of each pin is at least twice its width or diameter. In FIG. 1: (a) each of the pins is attached to a ball joint (e.g., 121, 122); and (b) each ball joint includes an attachment disk (e.g., 131, 132) that is embedded in the polymer mold.

In FIG. 1, linear actuators cause the respective pins to move along parallel (e.g., vertical) linear axes. Each individual pin may be actuated by one of the linear actuators.

In FIG. 1, a 10×5 array of linear actuators actuates motion of a 10×5 array of pins. However, the number of pins and linear actuators may vary, depending on the particular implementation of this invention. In some cases, the number of pins and number of actuators are equal. Alternatively, the number of actuators may be less than the number of pins.

Figure 2:
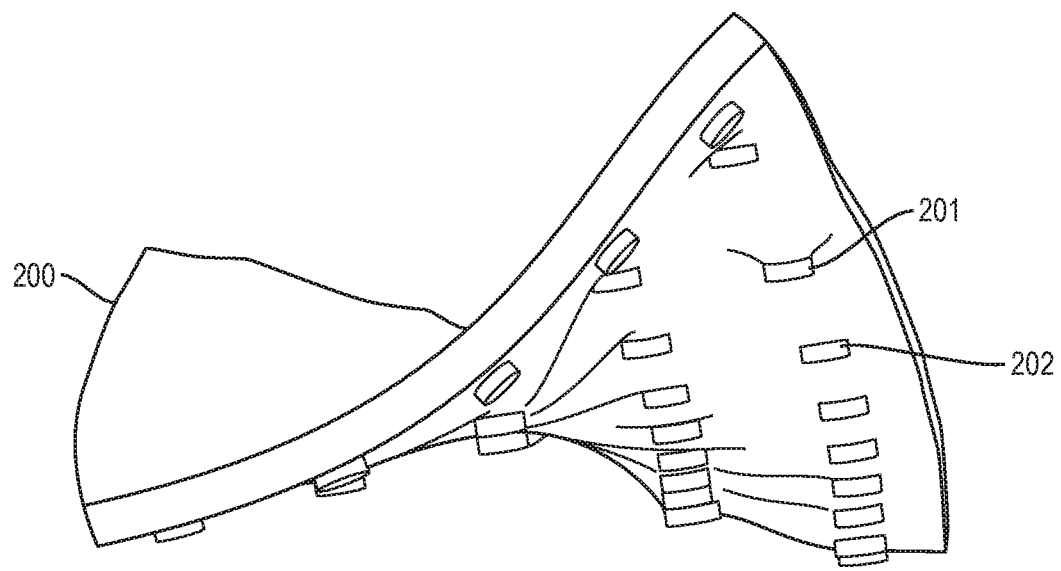
FIG. 2 shows elastic deformation of a polymer mold.

In illustrative implementations of this invention, linear motion of the pins causes elastic deformation of the polymer mold. For instance, the polymer mold may be deformed into a 3D curve. FIG. 2 shows an example of elastic deformation of a polymer mold. In FIG. 2, a polymer mold 200 has been elastically deformed into a 3D curve by actuated pins. The mold is attached to the pins at attachment regions (e.g., 201, 202) that are equidistant from each other when the mold is flat. In FIG. 2, the attachment regions are shown as disk-like bumps, for ease of illustration. In practice, however, the pins may be attached to the mold by ball joints or by any other joint or flexible mechanical connection.

Figure 3:
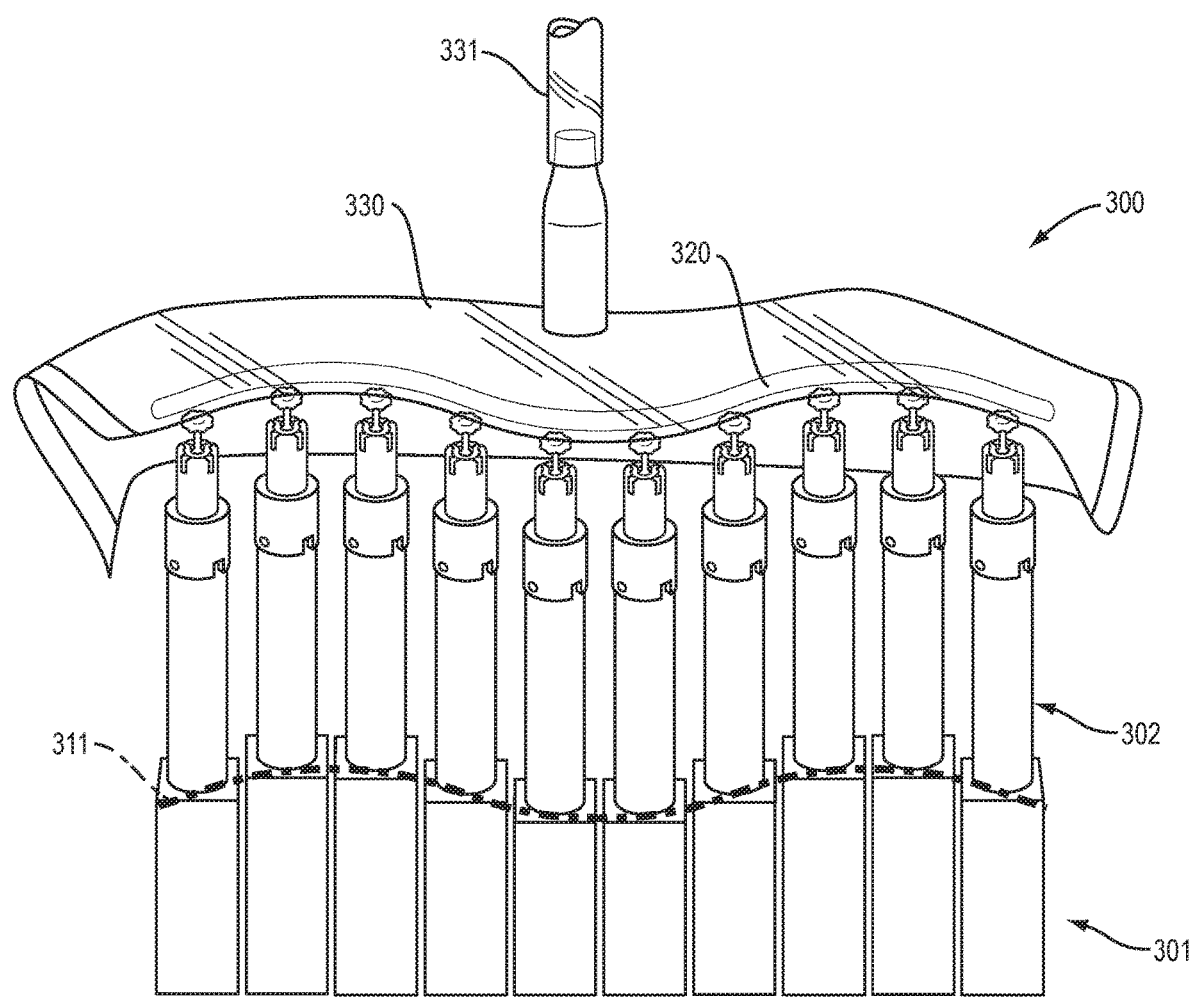
FIG. 3 shows a fabrication system with a heated, reconfigurable mold.

FIG. 3 shows a fabrication system with a heated, reconfigurable mold, in an illustrative implementation of this invention. In FIG. 3, fabrication system 300 includes an array of linear actuators 301 that actuate linear motion of an array of pins 302. In FIG. 3, the actuators have moved in such a way as to cause: (a) the upper ends of the actuators to form a sinusoidal curve 311; (b) the upper ends of the pins to form a sinusoidal curve; and (c) the polymer mold 320 to form a sinusoidal curve. A vacuum bag 330 and the polymer mold 320 together form a cavity. A hose 331 connects the vacuum bag to a vacuum pump. To create a partial vacuum in the cavity, the vacuum pump may remove air from the cavity. To raise air pressure in the bag, air may be allowed to flow (or may be pumped) through hose 331 back into the cavity.

Figure 4:
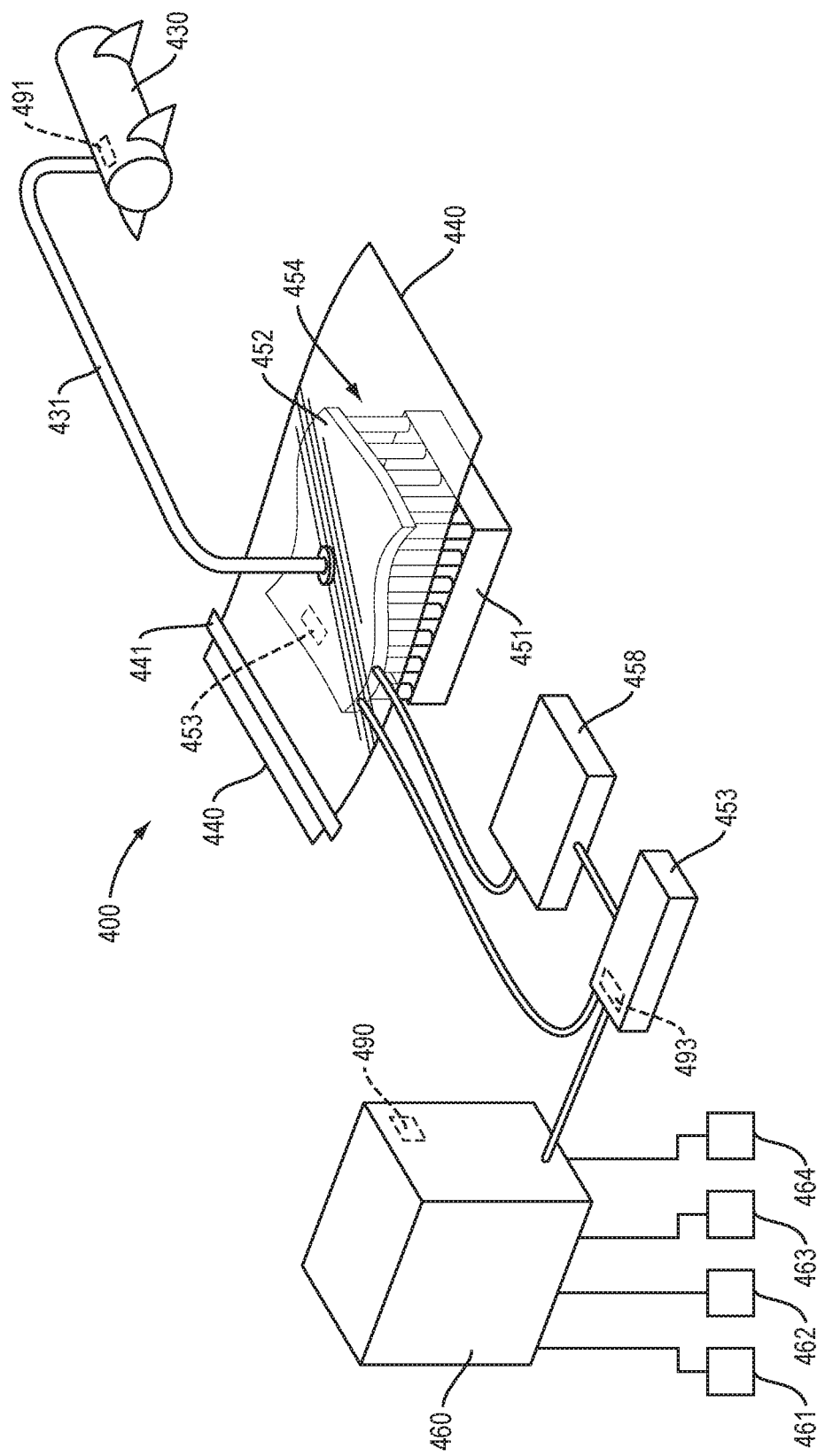
FIG. 4 shows another fabrication system with a heated, reconfigurable mold.

FIG. 4 shows a fabrication system with a heated, reconfigurable mold, in an illustrative implementation of this invention. In FIG. 4, an array of linear actuators 451 actuates linear motion of an array of pins 454. The motion of the pins in turn elastically deforms polymer mold 452. A power supply unit (PSU) 458 causes an electric current to flow through a heating element that is embedded in polymer mold 452. The current causes the heating element to heat the mold and (by conduction) to heat a composite object that is being fabricated and is adjacent to mold 452.

In FIG. 4, one or more temperature sensors (e.g., 453) are also embedded in mold 452. In some cases, the temperature sensor(s) each comprise a resistance temperature detector (RTD). For instance, each temperature sensor may be a coiled-element RTD, wire-wound RTD or thin-film RTD. Alternatively, the temperature sensor(s) each comprise a thermocouple. For instance, each temperature sensor may be a nickel-alloy thermocouple (e.g., a Type E, J, K, M, N or T nickel-alloy thermocouple), a platinum/rhodium-alloy thermocouple (e.g., a Type B, R or S platinum/rhodium-alloy thermocouple), a tungsten/rhenium-alloy thermocouple (e.g., a Type C, D, or G tungsten/rhenium-alloy thermocouple), or a chrome/gold/iron-alloy thermocouple.

Temperature readings taken by the temperature sensor(s) may provide feedback to a microcontroller 453 that controls the PSU. For instance, microcontroller 453 may, based on feedback from the temperature sensors, control the amount of power delivered to the heating element by the PSU, and may thereby control temperature in the mold and in the composite material that is adjacent to the mold.

In FIG. 4, vacuum bag 440 and polymer mold 452 together enclose a cavity. Vacuum bag 440 may be sealed shut by a metal clamp 441. A hose 431 may connect the vacuum bag 440 to vacuum pump 430. Hose 431 may be attached to the vacuum pump by clamps. Also, hose 431 may be attached to the vacuum bag by a vacuum connector that is inside the bag and that includes an airtight O-ring seal (which prevents air from leaking around the outside of the hose).

The vacuum pump may pump air out of the vacuum bag through hose 431. Likewise, air may be let back into vacuum bag 440 through hose 431.

In some cases, hardware devices in the fabrication system communicate with each other by wired or wireless radio signals. For instance, wireless modules 490, 491, 492 may transmit and receive wireless radio signals, enabling computer 460 or microprocessor 453 to control pump 430.

Computer 460 may accept input from a human user via one or more input/output devices, such as a touch screen 461, keyboard 462, mouse 463, and microphone 464. For instance, this input may specific fabrication parameters (temperature, vacuum on/off cycle, and cure period) for a specific composite material. Based on this input, computer 460 may control other devices in the system in order to cause the composite object to be fabricated in accordance with the fabrication parameters inputted by the human user.

In some implementations of this invention, an object is fabricated from layers of a composite material that includes fibers and a thermosetting polymer. The thermosetting polymer may bind the fibers together.

In some cases, the layers of composite material comprise pre-peg, in which the composite has been "pre-impregnated" with a partially cured resin. For instance, the resin may have already been partially cured by heat or light. The pre-peg may be applied layer-by-layer in a so-called "dry-layup" method. Alternatively, a wet-layup method may be employed, in which layers of fiber and uncured resin are applied. In either case (dry-layup or wet-layup), the layers may be placed, layer-by-layer: (a) by hand with a desired orientation of fibers; or (b) by an automated process with a desired orientation of fibers. In some cases, the pre-peg comprises a CFRP pre-peg.

System Parameters

In some implementations of this invention, the maximum force F exerted by each individual actuated pin on the polymer mold is in the range of $50N \leq F \leq 100N$, where N is Newtons. In some cases, this range of force is desirable because it enables a high amount of deformation of the polymer mold (e.g., in small regions of the mold), but is not so great that it causes a rupture or tear of the polymer mold. In some implementations, the greater the maximum force exerted by the actuated pins against the mold, the greater the deformation of the polymer mold that may be achieved, as long as the force is not so strong that it causes the mold to rupture or tear. In some cases, the maximum force exerted by each individual actuated pin on the polymer mold is approximately 12 Newtons.

In some implementations, the thickness d of the polymer mold is in the range of $8 \leq d \leq 12$ millimeters. In some cases, this thickness of the mold is desirable because: (a) this thickness is sufficient to prevent the side of the polymer mold that faces the object being cured from having bumps, elevations or wrinkles that may otherwise arise due to force exerted by the actuated pins on the opposite side of the polymer mold; and (b) this thickness is still small enough that the amount of force needed to deform the mold is acceptably low (e.g., low enough not to tear or rip the mold).

In some implementations of this invention: (a) the maximum force F exerted by each individual actuated pin on the polymer mold is in the range of $50N \leq F \leq 100N$, where N is Newtons; and (b) the thickness d of the polymer mold is in the range of $8 \leq d \leq 12$ millimeters.

In some cases, each pin in the pin array is equidistant from each of its neighboring pins in the pin array. In some implementations, the pitch b of the pin array (i.e., the distance between the centers of neighboring pins in the pin array) is in the range of $9\ mm \leq b \leq 50\ mm$. Increased pin density (i.e., smaller pitch between pins) may be desirable: (a) to reduce the effect of gravity on the shape of the polymer mold; and (b) to increase resolution of the array of linear actuators, which in turn increases the maximum deformation per unit of distance of the polymer mold, which in turn increases the maximum spatial resolution of the object being fabricated. Put differently, higher pin density may enable finer details in the fabricated object. However, too great pin density may cause the polymer substrate to undergo too much deformation per unit of distance and thus to rip or tear. In other words, elongation of rupture may be a limiting factor on the pin density. In some implementations, to reduce the risk of rupture or tear of the polymer mold, the pitch b of the pin array (i.e., the distance between the centers of neighboring pins in the pin array) is in the range of $9\ mm \leq b \leq 11\ mm$. In some cases, to achieve fine resolution of the fabricated part, the pitch of the pin array is in the range of $5\ mm \leq b \leq 10\ mm$.

In some implementations, the maximum angle φ between an actuated pin and a local region of the surface of the polymer mold (which local region is centered at the point of attachment between the mold and the pin) is in the range of $20° \leq \varphi \leq 45°$. This range of angles may be achieved by employing a ball joint to connect each pin with the polymer substrate. In some cases, this range of angles is desirable because it: (a) enables fabricating parts with a high resolution and fine detail; (b) enables the actuated pins to transmit force to the polymer mold throughout a large linear displacement of the pins; and (c) does not restrict motion of the bearing studs in the ball joints.

In some implementations, it is desirable for the length l of the rod of each bearing stud (in a ball joint) to be in the range of 2 mm≤l≤100 mm. In some cases, this range of rod length l is desirable to transmit the linear 1D motion of the actuated pins precisely to the surface of the polymer mold.

In some cases, the maximum linear displacement α of an actuated pin is in the range of 5 mm≤α≤50 m. This range of maximum linear displacement may be desirable in order to achieve sufficient deformation of the polymer mold. In some cases, the distance Δα of each step of the linear displacement of an actuated pin is in the range of 10 μm≤Δα≤10 cm. A step distance in this range may be desirable, in order to achieve sufficiently fine resolution of the fabricated part. In some cases: (a) the maximum linear displacement α of an actuated pin is in the range of 5 mm≤α≤50 mm; and (b) the distance Δα of each step of the linear displacement is in the range of 10 μm≤Δα≤500 μm.

Polymer Mold

In some implementations of this invention, the coefficient of thermal expansion (CTE) α of the polymer mold is in a range of $$0 < \alpha \leq 50 \times 10^{-6} \frac{1}{K},$$

where K is degrees Kelvin. In some implementations of this invention, best results (e.g., fabrication without distortion or warping) are achieved when the coefficient of thermal expansion (CTE) α of the polymer mold is in a range of $$0 < \alpha \leq 5 \times 10^{-6} \frac{1}{K}.$$

In some use scenarios, it is desirable for the CTE of the polymer mold to be approximately equal to the CTE of the composite material that is being cured during the fabrication process. This is because mismatching of the CTEs may substantially reduce the quality of the fabricated object. For instance, if the CTE of the polymer mold and the CTE of the composite are mismatched, then spring-in or spring-back may occur. Put differently, if the CTEs are mismatched, then composite parts may be produced with internal tension and then, after being released from the mold, may spring outward (spring-back), or spring inward (spring-in), resulting in changed dimensions and warping.

Carbon fiber pre-pegs often have a CTE α that is approximately equal to $$5 \times 10^{-6} \frac{1}{K}.$$

In some implementations of this invention: (a) carbon fiber pre-pegs are cured during the fabrication process; and (b) the most accurate fabrication results (without warping or distortion) are achieved when the material of the polymer mold has a (CTE) α in a range of $$0 < \alpha \leq 5 \times 10^{-6} \frac{1}{K}.$$

In a prototype of this invention: (a) carbon fiber pre-pegs are cured during the fabrication process; and (b) the polymer mold has a $$CTE \text{ of } \alpha \approx 34 \times 10^{-6} \frac{1}{K}.$$

In illustrative implementations of this invention, it is desirable for the polymer mold to be a good conductor of heat. Put differently, in illustrative implementations, it is desirable for the polymer mold to have a high thermal conductivity λ, where the SI units of λ are watts per meter Kelvin $$\left(\frac{W}{mK}\right).$$

This is because, when the mold is a good conductor of heat, this enables the mold to quickly heat up and quickly cool down. Furthermore, when the mold is a good conductor of heat, this facilitates temperature control of the composite material, because the difference in temperatures of the heating element and an external surface of the mold tends to decrease as the mold's coefficient of heat transfer increases. In some implementations of this invention, the polymer mold has a thermal conductivity λ that is in a range of 0.95≤λ≤10,000. For instance, in a prototype of this invention, thermal conductivity λ of the polymer mold is equal to 1.

In illustrative implementations of this invention, the material of the polymer mold is selected to withstand, without substantial degradation over many fabrication runs, the heat of curing and thermal cycling, even under varying air pressure. In some use scenarios, thermal cycling occurs between a holding temperature (e.g., around 130 degrees Celsius) and room temperature (around 20 degrees Celsius). In illustrative implementations, the higher the cyclic lifetime of the polymer mold, the better. For instance, in some cases, the mean number of thermal cycles that the polymer mold undergoes before failure is: (a) greater than or equal to 10 cycles; or (b) greater than or equal to 20 cycles; or (c) greater than or equal to 50 cycles; or (d) greater than or equal to 100 cycles.

In illustrative implementations, the material of the polymer mold is sufficiently airtight to hold a vacuum or partial vacuum.

In some implementations of this invention, the polymer mold has a Young's modulus E in a range of 0.95≤E≤100 megapascals. This range of Young's modulus reflects a tradeoff. On the one hand, it is desirable for the mold to be stiff, in order to support and stabilize the composite object during lay-up and curing. On the other hand, it is desirable the mold to be sufficiently flexible or malleable at room temperature, in order to deform into a desired 3D shape when the actuated pins exert force against the mold. In some cases, the greater the force that the actuated pins exert, the higher the Young's modulus of the mold may be.

In some implementations of this invention, the polymer mold has an elongation at rupture $\varepsilon_R$ that is in a range of 20%≤$\varepsilon_R$≤100%. In some other implementations, the elongation at rupture $\varepsilon_R$ of the polymer mold is greater than 100% (e.g., the mold material may more than double in length before tearing). In illustrative implementation, it is desirable for the polymer mold to have a high elongation at rupture. The higher the elongation at rupture of the mold, the greater the deformation that the mold can withstand without tearing. Furthermore, the higher the elongation at rupture of the mold, the more detailed the fabricated part can be (due to the mold's increased ability to deform).

In illustrative implementations, the polymer mold comprises a thermoset polymer. For instance, the polymer mold may comprise one or more of the following polymers: Duralco® 4538, Aremco-Bond™ 820, and EPICLON® EXA-4816.

The resin to hardener ratio (RHR) of the polymer mold is the weight of resin to the weight of the hardener. The optimal range of RHR depends on the material used, and reflects a tradeoff between the advantages of higher RHR and the advantages of lower RHR. On the one hand, a higher RHR results in an increased Young's modulus (or stiffness), allowing for increased accuracy of the dimensions and shape of the fabricated part. On the other hand, a lower RHR yields higher elongation at rupture and increased flexibility, thereby enabling fabrication of a more finely detailed part. In some cases: (a) the polymer mold is fabricated from Duralco® 4538; (b) the RHR of the polymer mold is in the range of $0.37 \leq RHR \leq 0.47$; and (c) the elongation at rupture $\varepsilon_R$ is in the range of $75\% \leq \varepsilon_R \leq 80\%$.

In some cases, the polymer mold itself is manufactured by a process that includes at least the following steps: (1) thoroughly mix resin and hardener (e.g., in an RHR of approximately 0.42); (2) evacuate any air entrapped in the mixture; (3) apply a release agent to a surface of a second mold, which surface has the same shape as the desired shape of a surface of the polymer mold (the second mold being a mold that is used to manufacture the polymer mold); (4) pour a first layer of the viscous liquid mixture of resin and hardener into the second mold; (5) place one or more heating elements on top of the first layer; (6) pour a second layer of the viscous liquid mixture into the second mold; (7) insert, into the liquid mixture, an array of attachment disks of bearing studs of ball joints; (8) cure the polymer mold, thus causing the attachment disks to be embedded inside the cured polymer mold; and (8) release the polymer mold from the second mold. In some versions of the method described in the preceding sentence: (a) the second mold comprises glass; (b) the curing is performed at a pressure $P_{cure}$ that is in a range of $100$ mBar $\leq P_{cure} \leq 10$ Bar; and (c) the duration of the cure period $t_{cure}$ is in a range of $30$ minutes $\leq t_{cure} \leq 48$ hours. In some cases, the attachment disks (of the bearing studs of the ball joints) undergo a surface treatment (e.g., being rubbed with coarse sandpaper) before the attachment disks are inserted into the liquid mixture of resin and hardener. This surface treatment may increase surface area of the attachment disks, and thus yield stronger bonds between the attachment disks and the cured polymer mold. Alternatively, or in addition, the porosity of the attachment disks may be increased, in order to produce stronger bonds between the attachment disks and the polymer mold.

Vacuum

In illustrative implementations of this invention, the composite that is being fabricated (e.g., pre-peg) is inside a cavity formed by a flexible structure and the polymer mold. The air pressure inside this cavity may be controlled by a vacuum pump and one or more valves. We sometimes call the flexible structure a "vacuum bag". The vacuum bag may comprise one or more flexible polymer sheets. In some cases, the vacuum bag is transparent or translucent, which enables a human user to look through the bag to see the composite being fabricated (which is inside the cavity formed by the vacuum bag and the polymer bag).

A vacuum pump may pump air out of the cavity, in order to lower air pressure inside the bag. For instance, removing air from the cavity may cause air pressure inside the cavity to be 700 to 900 millibars less than the air pressure of ambient air outside the vacuum bag. This difference in air pressure may cause at least a portion of the vacuum bag to press tightly against the composite being fabricated (e.g., due to ambient air at a higher air pressure pressing against an external flexible surface of the bag). The pressure exerted by the vacuum bag against the composite may in turn cause the composite: (a) to press tightly against the mold; and thus (b) conform to the mold's shape (despite any thermal expansion of the composite that occurs while the composite is being heated). Furthermore, the pressure exerted by the vacuum bag against the composite may expel, from the composite, air or other gas that would otherwise be trapped inside the composite. For instance, this pressure may expel bubbles of gas that form between layers of the composite (e.g., during heating). Also, the pressure exerted by the vacuum bag against the composite may expel excess resin from the composite, thereby tending to reduce variation in density of resin (i.e., amount of resin per unit volume) in the composite. Creating a partial vacuum (which causes a portion of the vacuum bag to press against the composite) may tend to prevent delamination of the composite, in which layers of the composite separate from each other.

In some implementations, pre-peg is deposited layer-by-layer, either manually or by an automated process, during dry or wet layup. Each layer of pre-peg may be deposited by pressing the layer against the mold or against existing layers of the composite object. After each layer of pre-peg is deposited, the vacuum pump may create a partial vacuum inside the cavity for a short period and then ambient air pressure may be restored in the cavity. Applying the partial vacuum after each layer of pre-peg is deposited may ensure that the layers are pressed closely together. Furthermore, applying the partial vacuum after each layer of pre-peg is deposited may cause the first layer of pre-peg (closest to the mold) to conform to the mold. Put differently, it may cause the shape of the pre-peg layer that is closest to the mold to match the shape of the surface of the polymer mold that is closest to the pre-peg.

In some implementations: (a) the vacuum pump creates a partial vacuum inside the cavity formed by the vacuum bag and polymer bag; and (b) this partial vacuum is maintained throughout the entire curing process which can take more than one hour (e.g., 30 minutes to 6 hours). Applying a partial vacuum throughout the curing process: (a) may remove any excess air or other gas (e.g., air or gas released during liquification of a two-part epoxy that the carbon fiber is impregnated with); (b) may reduce deformation that could result from thermal expansion; and (c) may reduce humidity. In some cases, applying a partial vacuum throughout the curing process also: (a) removes resin; and (b) increases fiber-to-resin ratio (which in turn may result in desirable material properties). The partial vacuum may be released after the curing cycle is complete and the resin in the part being fabricated has fully hardened. In some cases, the partial vacuum is released when curing is complete and the part being fabricated has reached a temperature that is less than or equal to 60 degrees Celsius.

FIGS. 5A, 5B, 5C, 5D, and 5E illustrate a fabrication method, in which a partial vacuum is employed.

In FIG. 5A, actuators 505 have moved pins 504 into a "neutral" position, thereby causing polymer mold 502 to be flat. Also, in FIG. 5A, a vacuum bag 501 is open. This allows a human user 520 to reach inside the bag and manually apply pre-peg layer-by-layer on top of the mold, while the mold is flat.

In FIG. 5B, vacuum bag 501 has been sealed shut, with a metal clamp 503 and/or adhesive tape.

In FIG. 5C, actuators 505 have moved pins 504 so that the ends of the pins that face the polymer mold are arranged in a 3D curve, which in turn has caused the shape of the polymer mold to deform into a 3D curve. Then air has been evacuated from a cavity (formed by vacuum bag 501 and mold 502), creating a partial vacuum in the cavity. The resulting air pressure differential (between ambient air and the cavity) has caused a portion of the vacuum bag to press tightly against the composite material, which in turn has caused the composite to press against—and conform to the shape of—the polymer mold.

The partial vacuum that occurs in FIG. 5C may be applied repeatedly. For instance, after each layer of the composite material is deposited, a partial vacuum may be created and then released. Furthermore, a partial vacuum may be applied while curing the composite, and then released when curing is complete.

In FIG. 5D, the curing process had been completed and the vacuum bag 501 has been opened, allowing a human user 520 to reach into the bag and removed the cured composite.

FIG. 5E shows a cured composite part 510. The curved 3D shape of the cured part matches the curved 3D shape in which the polymer mold was deformed while the partial vacuum was applied and while the part was curing.

Figure 6:
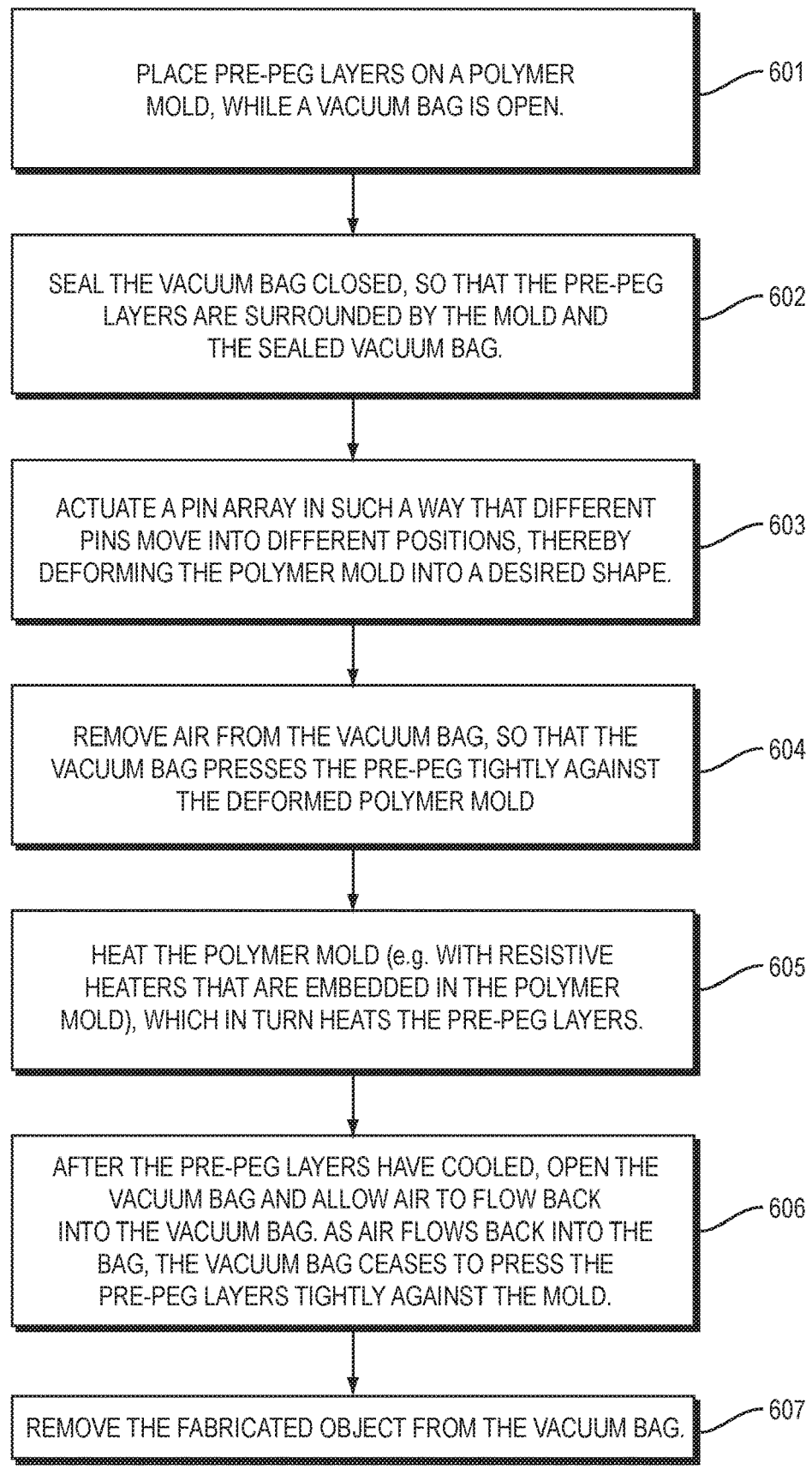
FIG. 6 is a flowchart of a fabrication method that uses a heated, reconfigurable mold.

FIG. 6 is a flowchart of a fabrication method that employs a heated, reconfigurable mold. In the example shown in FIG. 6, the method includes at least the following steps: Place pre-peg layers on a polymer mold, while a vacuum bag is open (Step 601). Seal the vacuum bag closed, so that the pre-peg layers are surrounded by the mold and the sealed vacuum bag (Step 602). Actuate a pin array in such a way that different pins move into different positions, thereby deforming the polymer mold into a desired shape (Step 603). Remove air from the vacuum bag, so that the vacuum bag presses the pre-peg tightly against the deformed polymer mold (Step 604). Heat the polymer mold (e.g., with resistive heaters that are embedded in the mold), which in turn heats the pre-peg layers (Step 605). After the pre-peg layers have cooled, open the vacuum bag and allow air to flow back into the vacuum bag. As air flows back into the bag, the vacuum bag ceases to press the pre-peg layers tightly against the mold (Step 606). Remove the fabricated object from the vacuum bag (Step 607).

Figure 7A:
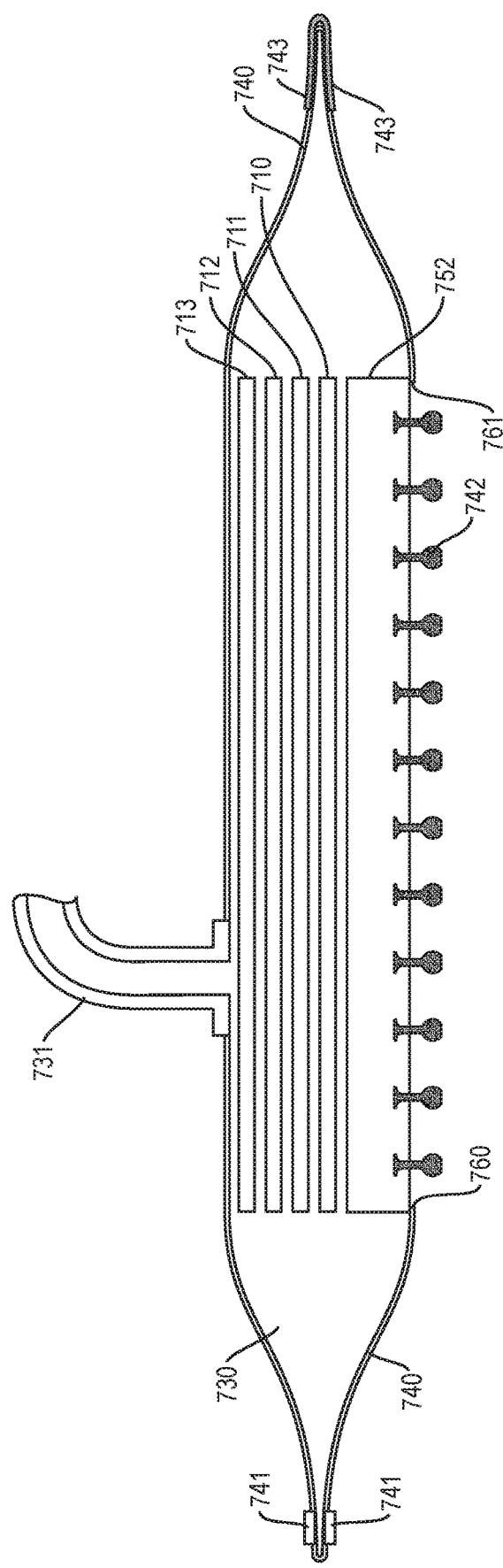
FIG. 7A shows layers that surround a composite part being fabricated.

FIG. 7A shows layers that surround a composite that is being fabricated. In FIG. 7A, a composite material 711 is being fabricated into a finished part. Composite 711 may comprise multiple layers (e.g., layers of pre-peg). A vacuum bag 740 is attached (by a sealant or otherwise) to outer edges of the bottom side of a polymer mold 752 (e.g., at locations 760, 761 on outer edges of the bottom surface of the mold). One side of vacuum bag 740 is sealed closed by two sides of an elongated metal clamp 741. Other sides of vacuum bag 740 are sealed closed by a sticky vacuum sealant tape 743.

Thus, in FIG. 7A, an airtight cavity 730 is formed by vacuum bag 740 and the upper and side surfaces of polymer mold 752. Vacuum bag 740 may comprise one or more flexible polymer membranes or flexible polymer sheets. Air pressure inside this cavity may be varied by moving air into or out of the cavity through hose 731. For instance, a partial vacuum may be created inside of this cavity, by evacuating most of the air from the cavity. Hose 731 connects to a vacuum pump (not shown in FIG. 7A).

In FIG. 7A, a thin layer of a release agent 710 (e.g., FibreGlast® FibRelease™) is positioned between polymer mold 752 and composite 711. Also, a release film 712 is positioned between the composite 711 and a breather cloth 713. The release agent 710 and release film 712 may facilitate release of composite 711 from the polymer mold and the breather cloth, respectively, after composite 711 is cured.

In some cases, release film 712 comprises fluorinated ethylene propylene. Release film 712 may be penetrated by holes that are too small to be seen by unaided human vision and that allow gas to travel through the release film from composite 711 to breather cloth 713 or vice versa.

Breather cloth 713 may be employed to achieve equal distribution of vacuum pressure. Breather cloth 713 may enable gases to travel freely through it. In some cases, the breather cloth is a non-woven polymer (e.g., polyester) fabric.

In FIG. 7A, bearing studs (e.g., 742) are partially embedded in polymer mold 752 and protrude from the bottom surface of the mold.

Figure 7B:
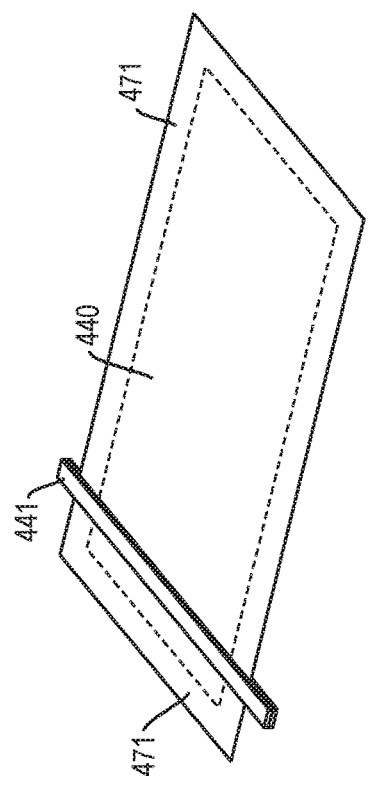
FIG. 7B shows a vacuum bag.

FIG. 7B shows a vacuum bag. In the example shown in FIG. 7B, edges of a vacuum bag 471 are sealed in an airtight manner by a vacuum sealant tape 471 and/or by a metal clamp 741.

Ball Joints

In some implementations of this invention, the polymer mold is attached to the actuated pins by ball joints and optionally by adapters that are interposed between the ball joints and pins. Each of the ball joints may include a bearing stud and a bearing socket.

Figure 7C:
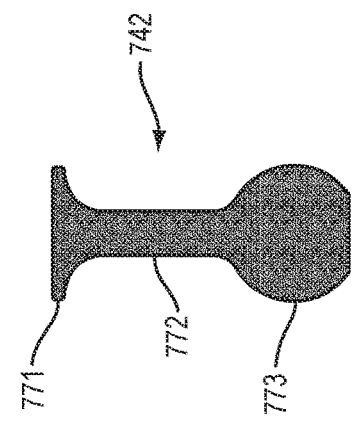
FIG. 7C shows a bearing stud of a ball joint.

FIG. 7C shows a bearing stud of a ball joint. In FIG. 7C, the bearing stud 742 includes an attachment disk 771, rod 772, and roughly spherical protuberance 773. In illustrative implementations, each bearing stud is partially embedded in the polymer mold. Specifically, in some cases: (a) the attachment disk of each bearing stud is embedded entirely inside the polymer mold; and (b) a portion, but not all, of the rod of each bearing stud is embedded in the polymer mold. In some cases, the attachment disk has a radius approximately 1 to 10 times the radius of the rod.

FIG. 7D shows a ball joint 781, which is attached to an adapter 782, which in turn is attached to an actuated pin 780.

FIG. 7E is an exploded view of a ball joint, adapter and actuated pin. In FIG. 7E, adapter 782 is attached to the ball joint and actuated pin by twist-to-lock mechanisms. Specifically, adapter 782 includes male parts 783 and 784, which are located at respective ends of adapter 782. These male parts may be inserted into female parts 785 and 786 at the ends of the ball joint 781 and pin 780, respectively, and then rotated into a "locked" position.

FIG. 7F shows a cross-section of a bearing socket 781 of a ball joint. In FIG. 7F, the bearing socket forms a spherical cavity 787. The roughly spherical protuberance 773 of a bearing stud is positioned inside this cavity. Cavity 787 is sufficiently large to enable the bearing stud to move into different angular orientations relative to cavity 787. In FIG. 7F, a borehole 790 is aligned with the central, longitudinal axis of the bearing socket.

Figure 7G:
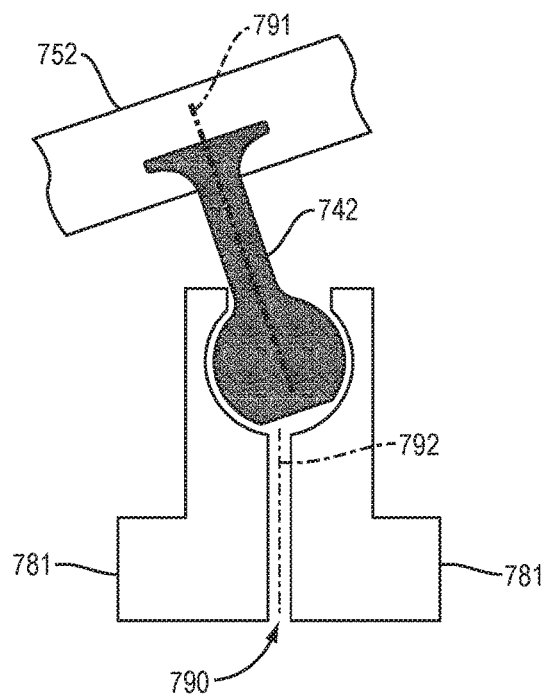
Figure 7H:
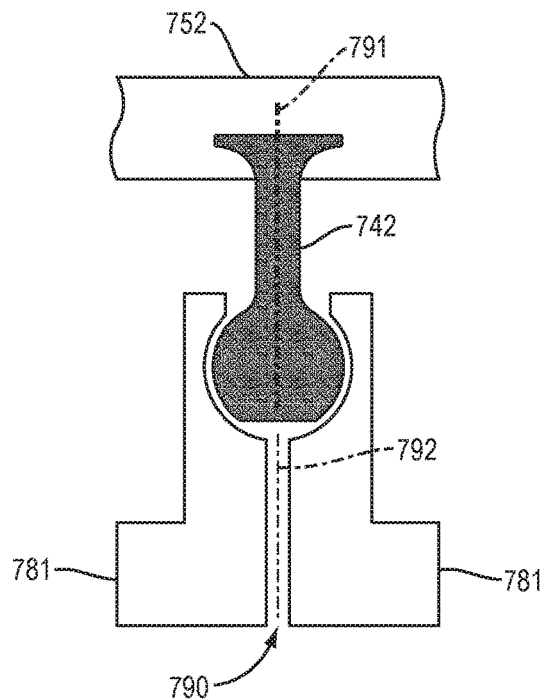

FIGS. 7G and 7H illustrate how a ball joint may enable a polymer mold 752 to change angular orientation relative to a bearing socket 781 of the ball joint (and relative to an actuated pin to which the bearing socket is indirectly attached via an adapter). In FIGS. 7G and 7H, a bearing stud 742 of a ball joint is partially embedded in polymer mold 752. In FIG. 7H, the central, longitudinal axis 791 of the rod of the bearing stud is aligned with the central, longitudinal axis 792 of bearing socket 781. In contrast, in FIG. 7G, the central, longitudinal axis 791 of the rod of the bearing stud is inclined at an angle (other than 180 degrees) relative to the central, longitudinal axis 792 of bearing socket 781.

Figure 7I:
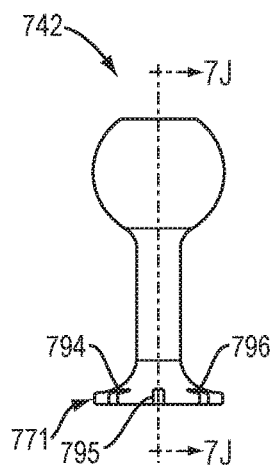
Figure 7J:
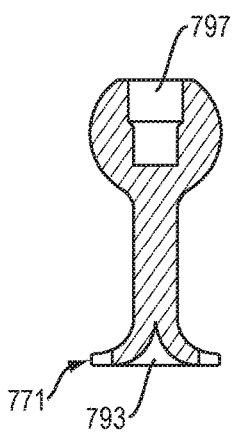

FIGS. 7I and 7J show a side view and cross-sectional view, respectively, of a bearing stud 742. The attachment disk 771 of the bearing stud has multiple indentations (e.g., 793, 794, 795, 796). These indentations increase the surface area of the attachment disk. The attachment disk 771 may comprise a flange, with indentations in the flange to increase its surface area.

Figure 7K:
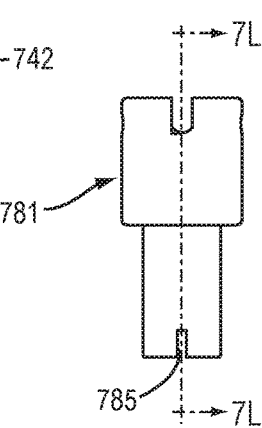
Figure 7L:
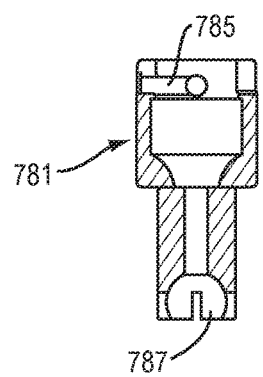

FIGS. 7K and 7L show a side view and cross-sectional view, respectively, of a bearing socket 781 of a ball joint.

As noted above, the polymer mold may be fabricated by curing a liquid mixture of resin and hardener. In some implementations: (a) an array of ball joints is partially inserted into this liquid mixture before the polymer mold cures; and (b) thus, after the polymer mold cures, a portion of each ball joint is embedded in the polymer mold. Specifically, the attachment disk and part of the rod of the bearing stud of each ball joint may be immersed into the liquid mixture before the mixture cures, and thus may be embedded in the polymer mold after the mold cures. A stencil (e.g., an acrylic or metal stencil) may fix positions of the bearing sockets of the ball joints relative to each other during curing of the polymer mold, and may be removed after the mold cures. The stencil may ensure that pitch between bearing sockets is constant and may also ensure that the bearing studs are all immersed to the same depth in the liquid mixture. When the attachment disks are inserted into the liquid mixture, indentations (e.g., 793, 794, 795, 796) may fill with liquid mixture, which may result in stronger bonds between the polymer mold and the respective attachment disks. Put differently, the indentations in the attachment disks may increase the surface area of the attachment disks, which in turn may result in stronger bonding between the attachment disks and the polymer mold. Alternatively or in addition, the bonding between attachment disks and mold may be strengthened by: (a) increasing the porosity of the attachment disks; or (b) applying a surface treatment to the attachment disks (e.g., rubbing them with sandpaper before immersing them in the liquid mixture).

In some implementations, a nail is inserted into each ball joint while a portion of the ball joint is immersed in the liquid mixture (which cures into the polymer mold). The nail may align the bearing stud of the ball joint with the bearing socket. In conjunction with the stencil, this may result in proper alignment of the bearing stud with the polymer mold. For instance, a nail may be inserted into the borehole (e.g., 790) of the bearing socket and into a corresponding borehole 797 in the spherical portion of the bearing stud, while the ball joint is partially immersed in the liquid mixture. This nail may be removed after the liquid mixture cures to form the polymer mold. Alternatively, any rigid elongated object that fits into the boreholes may be employed instead of a nail. In some cases: (a) each bearing stud has an elongated borehole (e.g., 797), which borehole has a longitudinal axis that is parallel to an axis of symmetry of the bearing stud; and (b) each bearing socket has an elongated borehole (e.g., 790), which borehole has a longitudinal axis that is parallel to an axis of symmetry of the bearing socket.

In some cases, the ball joint comprises a refractory, rigid epoxy (e.g., Formlabs® High-Temp Resin). In other cases, the ball joint may comprise metal (e.g. steel or aluminum) or ceramics. In some cases, the ball joints are sealed and are so-called "lubed for life". In other cases, lubricants are added to the ball joints from time to time. For instance, the ball joints may be lubricated by inserting lubricant into the boreholes formerly used for alignment. The lubrication may be controlled by external lubricant feed circuitry.

Heating Element

FIGS. 8A, 8B, 9A and 9B show heating elements that are embedded in a polymer mold. Each of these heating elements may heat the mold by Joule heating. This heat may conduct through the mold and to an adjacent composite material (e.g., pre-peg), causing the composite to fuse, cure, melt, set and/or thermoset. In some cases, each of the heating elements is an etched foil heater. For instance, each etched foil heater: (a) may include metallic foil and a mica, silicone, polyimide, or polyester substrate; and (b) may be produced by a fabrication technique that involves depositing photoresist and a mask and chemically etching the foil. In some cases, each of the heating elements is a resistance wire. For instance, the resistance wire may comprise: (a) nickel; (b) nichrome; (c) an iron-chromium-aluminum alloy (such as Kanthal®); or (d) a material comprising one or more of aluminum, brass, carbon, constantan, copper, iron, Manganin®, molybdenum, nichrome, nichrome V, nickel, platinum, steel, stainless steel, titanium and zinc.

Figure 8A:
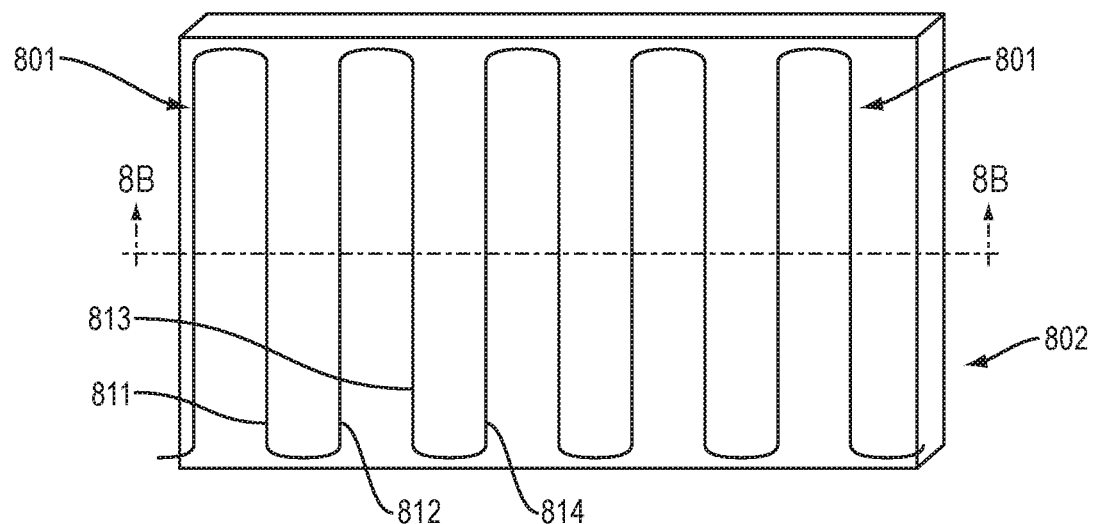
FIGS. 8A, 8B, 9A and 9B show heating element(s) in a polymer mold.

FIG. 8A is a top view of a region of polymer mold 802. In this region, a heating element is embedded inside—and is entirely beneath the top surface of—mold 802. In FIG. 8A, the conductive portion 801 of the heating element (e.g., a resistance wire or the foil in an etched foil heater) winds back and forth inside the mold in a spatial pattern that approximates a square wave with some curved edges. Alternatively, the conductive portion of the heating element may wind back and forth in a sinusoidal, zig-zag, square wave, convoluted, folded, or close-packed spatial pattern. In FIG. 8A, the pitch between neighboring up or down segments of the conductive portion of the heating element is constant. For instance, the distance between segments 811 and 812 of the conductive portion of the heating element is equal to the distance between segments 813 and 814.

Figure 8B:
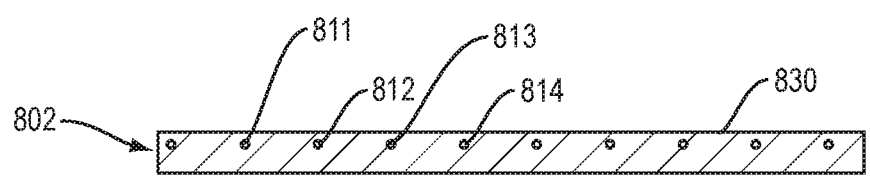
Figure 9B:
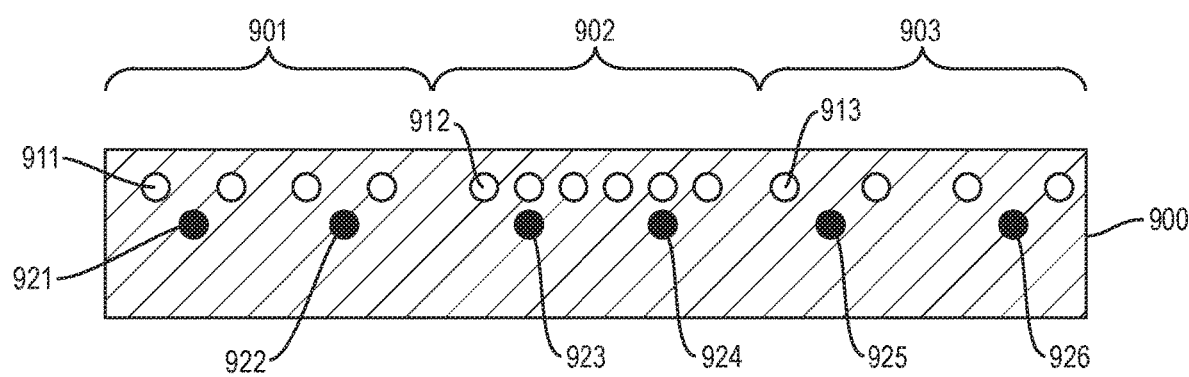
Figure 10:
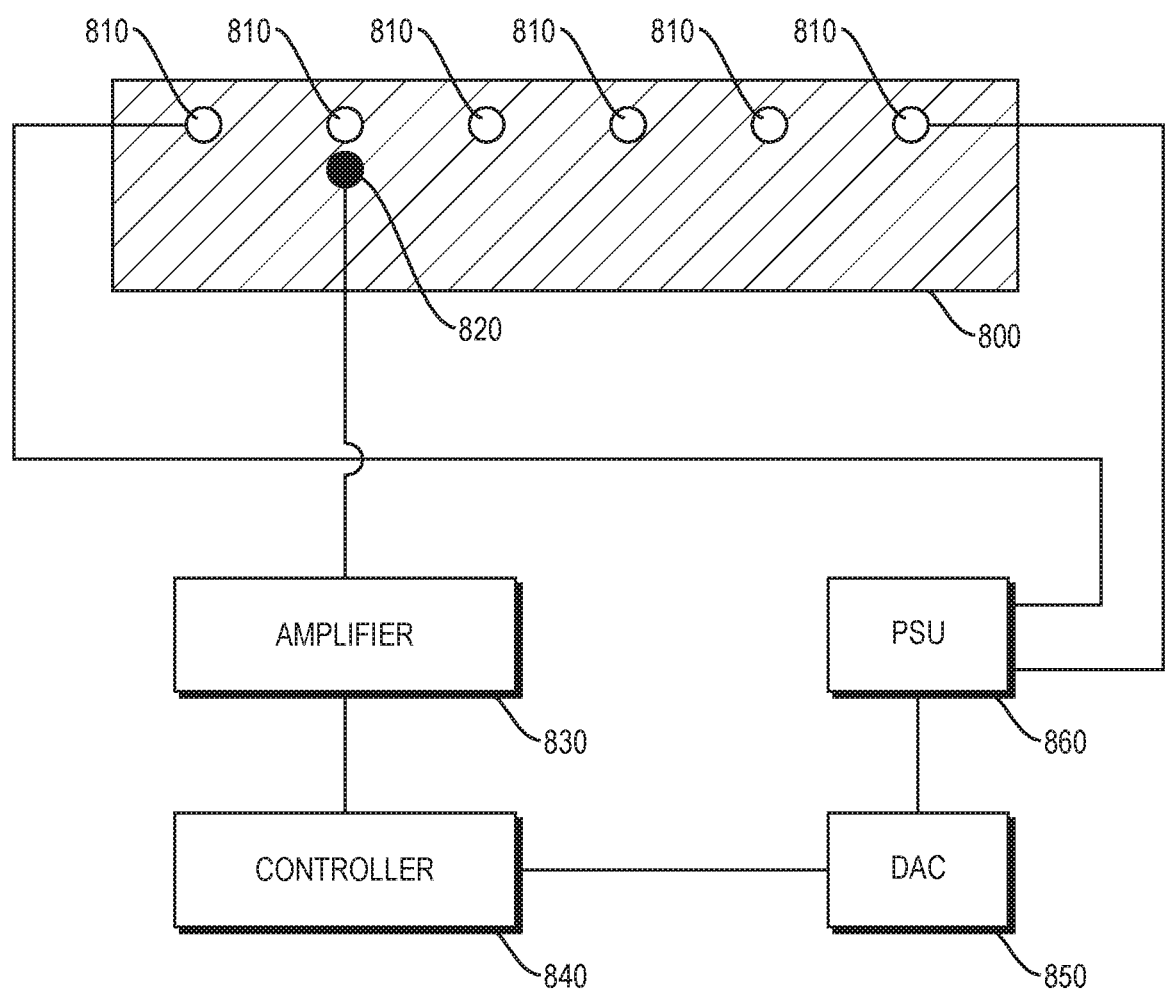
FIG. 10 shows hardware for closed loop temperature control.

FIG. 8B is a cross-sectional view of mold 802. In FIG. 8B, a heating element is embedded inside—but is close to the forming surface 830 of—mold 802. (The forming surface 830 is the surface of the mold that is closest to the composite material while the composite is being shaped by the mold). FIG. 8B shows cross-sections of different segments (e.g., 811, 812, 813, 814) of the conductive portion of the heating element. This conductive portion may comprise: (a) a resistance wire; or (b) foil in an etched foil heater. In FIGS. 8B, 9B and 10, the cross-sections of the conductive portion of the heating element(s) are shown as round. However, the conductive portion of a heating element may have any shape and its cross-section may have any shape. For instance, in an etched foil heater, the conductive foil may be shaped like a thin ribbon, and each cross-section of the foil may approximate a thin rectangle.

Figure 9A:
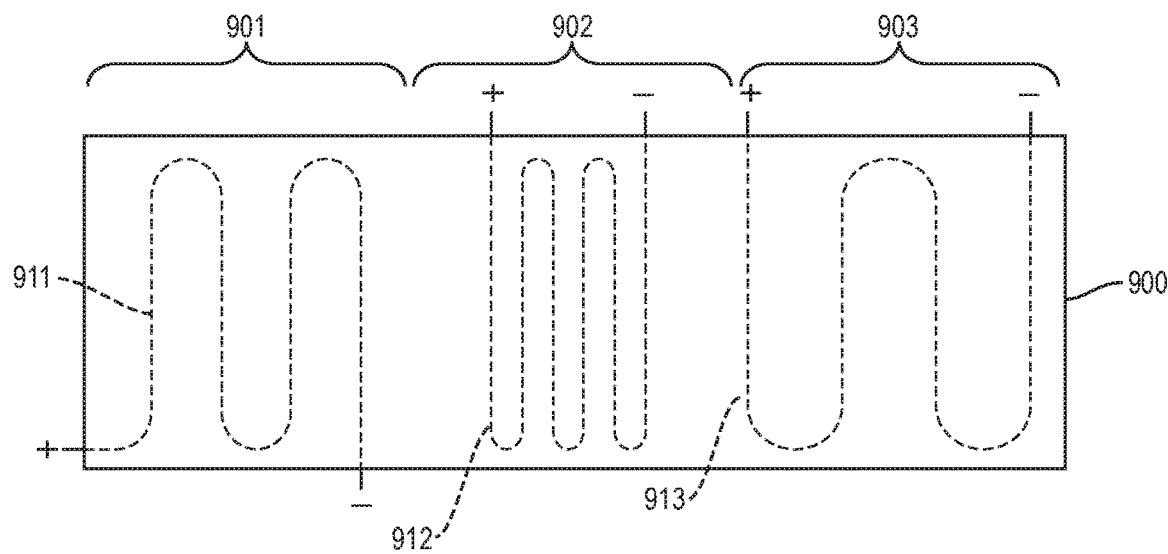

FIG. 9A is a top view of a polymer mold 900 which has three independently controlled heating regions. A conductive portion 911 of a first heating element is located in the first heating zone 901; a conductive portion 912 of a second heating element is located in the second heating zone 902; and a conductive portion 913 of a third heating element is located in the third heating zone 903. These three heating elements are embedded inside—and are entirely beneath the top surface of—mold 900.

FIG. 9B is a cross-sectional view of mold 900. FIG. 8B shows cross-sections of: (a) four segments (e.g., segment 911) of the conductive portion of the first heating element in the first heating zone 901; (b) six segments (e.g., segment 912) of the conductive portion of the second heating element in the second heating zone 902; and (c) three segments (e.g., segment 913) of the conductive portion of the third heating element in the third heating zone 903. Again, the conductive portion of each heating element may comprise: (a) a resistance wire; or (b) foil in an etched foil heater.

In FIGS. 9A and 9B, the pitch between segments of the conductive portions of the heating elements differs in different heating zones. In other words, the spatial frequency with which a conductive portion zigs back and forth may be different in different heating zones. Alternatively, in some cases, the pitch between segments of the conductive portion of heating elements is the same in each of the heating zones in a polymer mold.

In FIGS. 9A and 9B, the voltage for each of the three heating elements (and thus the power supplied to, and amount of heat produced by, each heating element) is independently controlled. There may be a separate power supply unit for each of the three heating elements (e.g., a total of three PSUs for the three heating elements). In some cases, a single microcontroller independently controls voltage for each of the three heating elements.

In FIGS. 9A and 9B, temperature control is based on feedback from temperature sensors. For instance: (a) temperature sensors 921, 922 may provide feedback regarding temperature in the first heating zone 901; (b) temperature sensors 923, 924 may provide feedback regarding temperature in the second heating zone 902; and (c) temperature sensors 925, 926 may provide feedback regarding temperature in the third heating zone 903. In some cases, the vertical distance between each heating element and the top surface of the mold is equal to the vertical distance between that heating element and the nearest temperature sensor. Put differently, the temperature sensors may be embedded at twice the depth inside the mold as are the heating element(s). Alternatively, in some cases, the temperature sensors are embedded at the same depth inside the mold as are the heating element(s).

In some cases: (a) a mean of temperature readings taken by multiple temperature sensors in a heating zone is calculated; and (b) this mean is fed as an input into a closed loop heating control algorithm that controls temperature in that heating zone.

In some cases, the pitch between segments of a conductive portion of a heating element is constant, in order to cause heat flux (heat flow per area) to be homogeneous. In some cases, wiring for each heating element enters and exits the polymer mold from the same single side of the polymer mold.

In some implementations, closed loop heating control is performed, based on feedback from temperature sensors. For instance, a microcontroller (e.g., an Arduino@ microcontroller) may execute a PID (proportional-integral-derivative) algorithm, based on feedback from temperature sensors.

FIG. 10 illustrates an example of hardware for closed loop temperature control. FIG. 10 shows: (a) a cross-section of polymer mold 800; and (b) cross-sections of segments of the conductive portion 810 of a heating element that is embedded in the mold. This conductive portion (e.g., resistance wire or foil in an etched foiled heater) winds back and forth inside the mold. Temperature sensor 820 is also embedded in the mold. For instance, temperature sensor 820 may be a resistance temperature detector (RTD) which includes a 4-wire, 3-wire, or 2-wire RTD bridge circuit. An amplifier 830 may amplify analog measurements taken by the temperature sensor. An ADC (analog-to-digital converter) 850 may be housed in controller 840 and may convert the amplified analog signal to digital data. One or more computer processors in controller 840 may, based on feedback from the temperature sensor, perform closed loop control of the temperature in the mold (e.g., by performing a PID control algorithm). A DAC (digital-to-analog) converter may convert digital data outputted by controller 840 into analog signal, which may in turn control the output voltage of power supply unit 860. The output voltage of power supply unit 860 may determine the electrical current that flows through the conductive portion 810 of the heating element.

In some implementations, two resistance temperature detectors (e.g., Pt100 or Pt1000 Class A sensors) are located in each heating zone. Each of this temperature sensors may include a 4-wire, 3-wire, or 2-wire RTD bridge circuit.

In some implementations, it is desirable to place the temperature sensors close to a surface of the mold that faces the pre-peg (but inside the mold itself), to ensure accurate temperature readings. Alternatively, the temperature sensors may be mounted: (a) on outside of the mold on the other surface of the mold (i.e., the surface farthest from the pre-peg); or (b) on a surface of the pre-peg itself.

The temperature, duration and other parameters of the cure cycle may depend on the particular composite material (e.g., particular type of pre-peg) that is being used in the fabrication. For instance, in some use scenarios of this invention, while a composite object is being cured: (a) the temperature is held steady for 4 hours at 131° C.; (b) the power applied to a resistance wire to maintain 131° C. is roughly 107 Watts; and (c) when temperature is ramped up or down at the start or end of the cure period, the temperature changes by no more than two degrees Celsius per minute.

In some cases, to achieve rapid cooling, cooling fans are employed to cool the composite by convection. In some cases, the temperature of a heating element inside a mold is set slightly hotter (e.g. 5-10 degrees Celsius hotter) than the desired temperature at the mold's surface, in order to compensate for heat losses in other directions.

In some cases, by using multiple independently controlled heating areas, different curing cycles are achieved. This in turn may enable different composite materials (e.g., different types of pre-peg) to be used in different regions of the object being fabricated.

In some cases, the heating element is embedded in the polymer mold as follows. (1) A first layer of the polymer mold is poured (and optionally is partially cured). For instance, this first layer may be about one-tenth of the width of the final mold. (2) A heating element is placed on top of this first layer, either manually or automatically by a machine. For instance, the heating element may comprise: (a) a resistance wire; or (b) foil in an etched foil heater. Optionally, if a resistance wire is used, the wire may be taped in place by a heat-resistant tape (e.g., Kapton@ tape), in order to ensure a desired spatial arrangement of the wire and to avoid short circuits. This may be particularly desirable if the resistance wire is manually placed. (3) A second layer of the mold may be poured over the heating element. (4) The second layer of the polymer mold may be cured. If the heating element comprises an etched foil heater, it may have holes or may be indented by cutouts. During fabrication of the polymer mold, liquid polymer may flow into these holes or cutouts, thereby: (a) connecting layers of the polymer mold that are on opposite sides of the etched foil heater; and (b) ensuring that these layers do not separate after curing.

Joining Multiple Parts

In some implementations, the fabrication system: (a) produces multiple parts made of composite material (e.g., CFRP); and (b) then joins the parts together to form a larger, monolithic object. For instance: (a) the system may produce multiple partially cured parts; (b) the polymer mold may move relative to the multiple parts, to a sequence of spatial positions; and (c) while the mold is at each of the respective spatial positions, the system may finish curing the part nearest to that position. For instance, the mold may move relative to the parts because: (a) the parts move relative to the Earth while the mold remains stationary relative to the Earth, or (b) the parts remain stationary relative to the Earth while the mold moves relative to the Earth.

In some cases, the system fabricates parts with uncured (or partially uncured) regions that act as hinges. This hinges may be functional in the finished part. For instance, the hinges may enable origami-like assembly of parts that: (a) pack flat; and (b) are later unfolded and heated at the edges to permanently set when deployed. The parts that are joined by these hinges may range in size (e.g., may have a width that is less than a centimeter, or less than a meter, or less than ten meters, or greater than ten meters).

Prototype

The following seven paragraphs describe a prototype of this invention.

In this prototype, a 5×10 array of 20 mm square pins actuate a 100 mm×200 mm mold. Each pin is actuated individually with a linear actuator that can provide a continuous force of 3.6 Newtons and a peak force of 10.7 Newtons. The linear actuator performs feedback-loop-controlled precision positioning with an accuracy of 120 μm.

In this prototype, a Rocker™ 810 vacuum pump evacuates air from a vacuum bag, producing up to an approximately 90 kPa pressure difference between ambient air pressure and air pressure inside the vacuum bag.

In this prototype: (a) the maximum voltage of the power supply is 36 volts; and (b) the resistance wire is about 4 meters long and comprises 26 AWG Ni200 Nickel wire. During manufacture of the polymer mold, the resistance wire is placed on top of a layer of the polymer mold in a regular meander pattern and taped in place by Kapton® tape.

In this prototype, a heating system heats parts of different thermal masses to temperature setpoints, and maintains those temperatures precisely. The heating system includes a resistance temperature detector (RTD), amplifier, microcontroller (Arduino® Mega 2560), and digital-to-analog converter connected to the voltage control input of the power supply. The temperature is monitored by the microcontroller and managed by a 5 Hz PID control algorithm tuned by Ziegler Nichols' tuning rules. This heating system achieves a maximum temperature deviation of ΔT≈0.5° C. from the target temperature during heating up and even less during holding of curing temperature.

In this prototype, a surface-mount resistance temperature detector (RTD) includes an IEC 60751:2008 Pt100 Class A sensor element in a four-wire configuration. The RTD has an accuracy of ±0.35° C. An Adafruit® PT100 RTD Temperature Sensor Amplifier with a Maxim Integrated® MAX31865 chip is used and the resistance is converted to temperature based on the Callendar-Van Dusen equation. On the output side of the controller, there is a MCP4725 I²C based 12-bit DAC that takes the Arduino® microcontroller's digital signal and converts it to an analog signal that controls the power supply's output voltage. The control algorithm is based on a PID library and executed on an Arduino® Mega 2560 microcontroller. For monitoring purposes, a 2.7" 128× 64 OLED display communicates through SPI (serial peripheral interface).

In this prototype, the PID controller may control temperate according to the following equation:

$$u(t) = K_P e(t) + K_I \int_0^t e(t')dt' + K_D \frac{de(t)}{dt}, \quad \text{(Equation 1)}$$

where u(t) is the control variable, and $K_p$, $K_D$ and $K_I$ are control parameters, t is time, and e(t) is an error value that is deviation of measured temperature from a target temperature (or setpoint).

In this prototype, the control parameters $K_p$, $K_D$ and $K_I$ in Equation 1 tend to have the following effects: (a) an independent increase of parameter $K_p$ tends to decrease rise time, increase overshoot, cause only a small change in settling time, decrease steady-state error, and decrease stability; (b) an independent increase of parameter $K_I$ tends to decrease rise time, increase overshoot, increase settling time, eliminate steady-state error, and decrease stability; and (c) an independent increase of parameter $K_D$ tends to cause only a minor change in rise time, decrease overshoot, decrease settling time, have no effect on steady-state error, and increase stability. In some use scenarios of this prototype, the control parameters are limited to integer values, and are set to $K_p$=92, $K_D$=209, and $K_I$=10.

The prototype described in the preceding seven paragraphs is a non-limiting example of this invention. This invention may be implemented in many other ways.

Software

In the Computer Program Listing above, two computer program files are listed. These two computer program files comprise software employed in a prototype of this invention.

In order to submit these two programs to the U.S. Patent and Trademark Office, the two program files were converted to ASCII .txt format. In each of these two programs, these changes may be reversed, so that the two programs may be run. Specifically, these changes may be reversed by deleting the ".txt" filename extensions for PIDandDisplay.txt and ReadData.txt and replacing them with ".ino" and ".py", respectively.

The PIDandDisplay.ino file is a program for PID temperature control that is implemented on an Arduino® microcontroller and that takes the input of the temperature sensors as a voltage and converts it to a temperature value using a look-up table. In this program, the temperature at a given time is compared to a desired temperature that is determined by time and a set ramping/cooling speed as well as holding temperature. Also, in this program, the controller's output is converted to a value that the connected digital-to-analog converter converts to a signal for the power supply. Also, this program controls a display to cause the display to show temperature and time data.

The ReadData.py program is optional. This program is written in Python® language and runs on a computer connected to the Arduino® controller. The tasks performed by this program include: (a) logging data; (b) validating the controller's performance; (c) checking for consistency; (d) saving temperature evolution; and (e) plotting data.

The PIDandDisplay.ino and ReadData.py programs each call external libraries.

This invention is not limited to the software set forth in these two computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to control the operation of, or interface with, hardware components of a fabrication system, including actuators, position sensors, power supply units, temperature sensors and a vacuum pump; (2) to perform closed loop control of position of actuators, based on feedback from position sensors; (3) to perform closed loop control of temperature, based on feedback from temperature sensors, (4) to control a vacuum pump (and, in some cases valves) to cause a partial vacuum to be applied or to be released in a cavity; (5) to cause heating element(s) embedded in a polymer mold to change temperature and/or to maintain a particular temperature; (6) to receive data from, control, or interface with one or more sensors; (7) to perform any other calculation, computation, program, algorithm, or computer function described or implied herein; (8) to receive signals indicative of human input; (9) to output signals for controlling transducers for outputting information in human perceivable format; (10) to process data, to perform computations, and to execute any algorithm or software; and (11) to control the read or write of data to and from memory devices (tasks 1-11 of this sentence being referred to herein as the "Computer Tasks"). The one or more computers (e.g. 453, 460, 840) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Network Communication

In illustrative implementations of this invention, one or more devices (e.g., 430, 453, 460, 840) are configured for wireless or wired communication with other devices in a network.

For example, in some cases, one or more of these devices include a wireless module for wireless communication with other devices in a network. Each wireless module (e.g., 490, 491, 492) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 453, 460, 840) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization.

As used herein, the phrase "is attached" describes a state of already being attached.

To compute "based on" specified data means to perform a computation that takes the specified data as an input.

The term "comprise" (and grammatical variations thereof) shall be construed as if followed by "without limitation". If A comprises B, then A includes B and may include other things.

Each of the following is a non-limiting example of a "computer", as that term is used herein: (a) a digital computer; (b) an analog computer; (c) a computer that performs both analog and digital computations; (d) a microcontroller; (e) a microprocessor; (f) a controller; (g) a tablet computer; (h) a notebook computer; (i) a laptop computer, (j) a personal computer; (k) a mainframe computer; and (l) a quantum computer. However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

As used herein, to say that an object is "elongated" means that the length of the object is a finite length that is at least twice the width of the object.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, to say that an elongated hole is "parallel" to a line means that a longitudinal axis of the hole is parallel to the line.

Nonlimiting examples of a first thing "pressing against" a second thing include: (a) the first thing touching the second thing while exerting force directly against the second thing; and (b) the first thing exerting force indirectly against the second thing through one or more intermediary objects.

Each of the following is a non-limiting example of "resin", as that term is used herein: (a) synthetic resin; (b) epoxy resin; (c) a resin that reacts with hardener to form a polymer; (d) a monomer resin, which reacts with a monomer hardener to form a plastic; (e) a plastic, which is the product of a reaction of resin and hardener; and (f) a resin copolymer that is the product of a reaction of a resin monomer and a hardener monomer.

As used herein, the term "set" does not include a group with no elements.

Unless the context clearly indicates otherwise, "some" means one or more.

As used herein, a "subset" of a set consists of less than all of the elements of the set.

The term "such as" means for example.

"3D" means three-dimensional.

To say that a machine-readable medium is "transitory" means that the medium is a transitory signal, such as an electromagnetic wave.

"2D" means two-dimensional.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) actuating linear motion of one or more pins in a set of pins in such a way as to cause a polymer mold to deform, by elastic deformation, into a three-dimensional (3D) geometric shape that includes 3D curves, which deformation in turn causes a composite material to deform; and (b) while the mold remains in the 3D shape (i) removing air from a cavity that is enclosed by at least a membrane and by the mold, which removing creates a pressure differential between pressure of air outside the cavity and pressure of air inside the cavity, which pressure differential in turn causes at least a portion of the membrane to press against the composite material, thereby causing the composite material to press against the polymer mold, and (ii) producing heat, by Joule heating of one or more heating elements embedded in the polymer mold, and thereby causing a portion of the heat to conduct from the mold to the composite material; wherein the mold is attached to the set of pins by a set of ball joints, each pin in the set of pins being attached to the mold by a single ball joint in the set of ball joints. In some cases, the composite material comprises carbon fiber reinforced polymer. In some cases, the composite material comprises a thermosetting material. In some cases, the composite material comprises a thermoplastic material. In some cases, the one or more heating elements each comprise a resistance wire. In some cases, the one or more heating elements each comprise an etched foil heater. In some cases, each particular ball joint in the set of ball joints is indirectly attached to a particular pin in the set of pins by an elongated structure that is located between, and that is mechanically attached to, the particular ball joint and the particular pin. In some cases: (a) the one or more heating elements consist of multiple heating elements that are located in different, non-overlapping regions of the polymer mold; and (b) temperature of each of the respective heating elements is independently controlled. In some cases, each ball joint, in the set of ball joints, comprises a bearing stud and a bearing socket, the bearing stud including a flange that is embedded in the polymer mold and that is indented by multiple indentations. In some cases, each ball joint, in the set of ball joints, comprises a bearing stud and a bearing socket, which bearing stud has an elongated borehole that is parallel to an axis of symmetry of the bearing stud, and which bearing socket has an elongated borehole that is parallel to an axis of symmetry of the bearing socket. In some cases: (a) immediately before being heated by the Joule heating, the composite material comprises multiple layers; and (b) the removing of air from the cavity is performed repeatedly, in such a way that the removing of air occurs immediately after each layer in at least a subset of the multiple layers is deposited. In some cases: (a) immediately before being heated by the Joule heating, the composite material comprises multiple layers; and (b) a partial vacuum that results from the removing of air is maintained during a curing of the polymer mold. Each of the cases described above in this paragraph is an example of the method described in the first sentence of this paragraph, and is also an example of an embodiment of this invention that may be combined with other embodiments of this invention.

In some implementations, this invention is a system comprising: (a) electric motors; (b) a set of pins; (c) a set of ball joints; (d) a polymer mold; (e) a membrane; (f) a vacuum pump; (g) one or more heating elements; and (h) one or more computers; wherein (1) the mold is attached to the set of pins by the set of ball joints, each pin in the set of pins being attached to the mold by a single ball joint in the set of ball joints; (2) the one or more heating elements are embedded in the polymer mold; (3) the one or more computers are programmed (A) to cause the electric motors to actuate linear motion of one or more pins in the set of pins and to thereby cause the polymer mold to deform, by elastic deformation, into a three-dimensional (3D) geometric shape that includes 3D curves, which deformation in turn causes a composite material to deform, and (B) while the mold remains in the 3D shape (I) to cause the vacuum pump to remove air from a cavity that is enclosed by at least the membrane and by the mold, thereby creating a pressure differential between pressure of air outside the cavity and pressure of air inside the cavity, which pressure differential in turn causes at least a portion of the membrane to press against the composite material, thereby causing the composite material to press against the polymer mold, and (II) to cause the one or more heating elements to produce, by Joule heating, heat that conducts from the mold to the composite material. In some cases, the polymer mold has a coefficient of thermal expansion α that is in a range of $$0 < \alpha \le 5 \times 10^{-6} \frac{1}{K},$$

where K is degrees Kelvin. In some cases, the polymer mold has a has a coefficient of heat conduction λ that is in a range of $$0.95 \le \lambda \le 10{,}000 \frac{W}{mK},$$

where W is watts, K is degrees Kelvin, and m is meters. In some cases, the composite material comprises carbon fiber reinforced polymer. In some cases, the composite material comprises a thermosetting material. In some cases, the one or more heating elements each comprise a resistance wire or an etched foil heater. In some cases, each ball joint, in the set of ball joints, comprises a bearing stud and a bearing socket, the bearing stud including a flange that is embedded in the polymer mold and that is indented by multiple indentations. In some cases, each ball joint, in the set of ball joints, comprises a bearing stud and a bearing socket, which bearing stud has an elongated borehole that is parallel to an axis of symmetry of the bearing stud, and which bearing socket has an elongated borehole that is parallel to an axis of symmetry of the bearing socket. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:
1. A method comprising:
   (a) actuating linear motion of one or more pins in a set of pins in such a way as to cause a polymer mold to deform, by elastic deformation, into a three-dimensional (3D) geometric shape that includes 3D curves, which deformation in turn causes a composite material to deform; and
   (b) while the mold remains in the 3D shape
      (i) removing air from a cavity that is enclosed by at least a membrane and by the mold, which removing creates a pressure differential between pressure of air outside the cavity and pressure of air inside the cavity, which pressure differential in turn causes at least a portion of the membrane to press against the composite material, thereby causing the composite material to press against the polymer mold, and
      (ii) producing heat, by Joule heating of one or more heating elements embedded in the polymer mold, and thereby causing a portion of the heat to conduct from the mold to the composite material;
wherein the mold is attached to the set of pins by a set of ball joints, each pin in the set of pins being attached to the mold by a single ball joint in the set of ball joints.

2. The method of claim 1, wherein the composite material comprises carbon fiber reinforced polymer.

3. The method of claim 1, wherein the composite material comprises a thermosetting material.

4. The method of claim 1, wherein the composite material comprises a thermoplastic material.

5. The method of claim 1, wherein the one or more heating elements each comprise a resistance wire.

6. The method of claim 1, wherein the one or more heating elements each comprise an etched foil heater.

7. The method of claim 1, wherein each particular ball joint in the set of ball joints is indirectly attached to a particular pin in the set of pins by an elongated structure that is located between, and that is mechanically attached to, the particular ball joint and the particular pin.

8. The method of claim 1, wherein:
   (a) the one or more heating elements consist of multiple heating elements that are located in different, non-overlapping regions of the polymer mold; and
   (b) temperature of each of the respective heating elements is independently controlled.

9. The method of claim 1, wherein each ball joint, in the set of ball joints, comprises a bearing stud and a bearing socket, the bearing stud including a flange that is embedded in the polymer mold and that is indented by multiple indentations.

10. The method of claim 1, wherein each ball joint, in the set of ball joints, comprises a bearing stud and a bearing socket, which bearing stud has an elongated borehole that is parallel to an axis of symmetry of the bearing stud, and which bearing socket has an elongated borehole that is parallel to an axis of symmetry of the bearing socket.

11. The method of claim 1, wherein:
   (a) immediately before being heated by the Joule heating, the composite material comprises multiple layers; and
   (b) the removing of air from the cavity is performed repeatedly, in such a way that the removing of air occurs immediately after each layer in at least a subset of the multiple layers is deposited.

12. The method of claim 1, wherein:
   (a) immediately before being heated by the Joule heating, the composite material comprises multiple layers; and
   (b) a partial vacuum that results from the removing of air is maintained during a curing of the polymer mold.

13. A system comprising:
   (a) electric motors;
   (b) a set of pins;
   (c) a set of ball joints;
   (d) a polymer mold;
   (e) a membrane;
   (f) a vacuum pump;
   (g) one or more heating elements; and
   (h) one or more computers;
wherein
   (1) the mold is attached to the set of pins by the set of ball joints, each pin in the set of pins being attached to the mold by a single ball joint in the set of ball joints;
   (2) the one or more heating elements are embedded in the polymer mold;
   (3) the one or more computers are programmed
      (A) to cause the electric motors to actuate linear motion of one or more pins in the set of pins and to thereby cause the polymer mold to deform, by elastic deformation, into a three-dimensional (3D) geometric shape that includes 3D curves, which deformation in turn causes a composite material to deform, and
      (B) while the mold remains in the 3D shape
         (I) to cause the vacuum pump to remove air from a cavity that is enclosed by at least the membrane and by the mold, thereby creating a pressure differential between pressure of air outside the cavity and pressure of air inside the cavity, which pressure differential in turn causes at least a portion of the membrane to press against the composite material, thereby causing the composite material to press against the polymer mold, and
         (II) to cause the one or more heating elements to produce, by Joule heating, heat that conducts from the mold to the composite material.

14. The system of claim 13, wherein the polymer mold has a coefficient of thermal expansion α that is in a range of $$0 < \alpha \leq 5 \times 10^{-6} \frac{1}{K},$$

where K is degrees Kelvin.

15. The system of claim 13, wherein the polymer mold has a thermal conductivity λ that is in a range of $$0.95 \leq \lambda \leq 10{,}000 \frac{W}{mK},$$

where W is watts, K is degrees Kelvin, and m is meters.

16. The system of claim 13, wherein the composite material comprises carbon fiber reinforced polymer.

17. The system of claim 13, wherein the composite material comprises a thermosetting material.

18. The system of claim 13, wherein the one or more heating elements each comprise a resistance wire or an etched foil heater.

19. The system of claim 13, wherein each ball joint, in the set of ball joints, comprises a bearing stud and a bearing socket, the bearing stud including a flange that is embedded in the polymer mold and that is indented by multiple indentations.

20. The system of claim 13, wherein each ball joint, in the set of ball joints, comprises a bearing stud and a bearing socket, which bearing stud has an elongated borehole that is parallel to an axis of symmetry of the bearing stud, and which bearing socket has an elongated borehole that is parallel to an axis of symmetry of the bearing socket.

* * * * *